(12) United States Patent
Pritchard et al.

(10) Patent No.: US 7,083,298 B2
(45) Date of Patent: Aug. 1, 2006

(54) SOLID STATE LIGHT SOURCE

(75) Inventors: Donald V. Pritchard, Glenshaw, PA (US); William J. Magiske, Verona, PA (US)

(73) Assignee: Led Pipe, Glenshaw, PA (US)

( * ) Notice: Subject to any disclaimer, the term of this patent is extended or adjusted under 35 U.S.C. 154(b) by 260 days.

(21) Appl. No.: 10/759,516

(22) Filed: Jan. 16, 2004

(65) Prior Publication Data
US 2004/0170014 A1 Sep. 2, 2004

Related U.S. Application Data

(63) Continuation-in-part of application No. 10/263,922, filed on Oct. 3, 2002, now Pat. No. 6,957,905.

(60) Provisional application No. 60/326,802, filed on Oct. 3, 2001.

(51) Int. Cl.
*F21V 33/00* (2006.01)
(52) U.S. Cl. .................. 362/184; 362/551; 362/191
(58) Field of Classification Search ............... 362/202, 362/800, 191, 396, 581, 551, 555
See application file for complete search history.

(56) References Cited

U.S. PATENT DOCUMENTS

| | | | |
|---|---|---|---|
| 3,582,638 A | 6/1971 | Peters | |
| 4,211,955 A | 7/1980 | Ray | |
| 4,234,911 A | 11/1980 | Faith | |
| 4,280,122 A | 7/1981 | McKinley et al. | |
| 4,346,329 A | 8/1982 | Schmidt | |
| 4,772,128 A | 9/1988 | Vinarub et al. | |
| 4,819,141 A | 4/1989 | Maglica et al. | |
| 5,062,026 A | 10/1991 | Maglica et al. | |
| 5,102,227 A | 4/1992 | Zwirner et al. | |
| 5,103,384 A * | 4/1992 | Drohan | 362/191 |
| 5,184,884 A | 2/1993 | Maglica et al. | |
| 5,187,611 A | 2/1993 | White et al. | |
| 5,187,765 A | 2/1993 | Muehlemann et al. | |
| 5,193,898 A | 3/1993 | Maglica et al. | |
| D334,718 S | 4/1993 | Basden et al. | |
| D336,535 S | 6/1993 | Maglica et al. | |
| 5,229,842 A | 7/1993 | Dolan et al. | |
| RE34,345 E | 8/1993 | Vinarub et al. | |
| 5,276,504 A | 1/1994 | Zwirner et al. | |
| 5,461,417 A | 10/1995 | White et al. | |
| 5,550,946 A | 8/1996 | Muehlemann et al. | |
| 5,579,177 A | 11/1996 | Stumpf | |
| 5,580,147 A | 12/1996 | Salerno | |
| 5,591,972 A | 1/1997 | Noble et al. | |
| 5,604,550 A | 2/1997 | White | |
| 5,634,711 A | 6/1997 | Kennedy et al. | |

(Continued)

OTHER PUBLICATIONS

Cal-Centron Wholesale Co., Lightwave™ LED Flachlights Tomorrow's Flashlight is here today!, www.longlight.com.

*Primary Examiner*—Ali Alavi
(74) *Attorney, Agent, or Firm*—Blynn L. Shideler; Krisanne Shideler; BLK Law Group

(57) ABSTRACT

A modular light source system forms a plurality of distinct light sources with a common tubular metal housing, an LED based lighting element for each light source, and a pair of end caps on opposed ends of the metal housing for each light source. Each distinct lighting source is comprised of one of the LED based lighting elements and a given pair of the end caps, whereby distinct light sources can be formed through replacement of the LED based lighting elements and the end caps.

19 Claims, 35 Drawing Sheets

U.S. PATENT DOCUMENTS

| | | |
|---|---|---|
| 5,661,838 A | 8/1997 | Muehlemann et al. |
| 5,684,530 A | 11/1997 | White |
| 5,713,661 A | 2/1998 | White |
| 5,746,495 A | 5/1998 | Klamm |
| 5,752,767 A | 5/1998 | Muehlemann |
| 5,761,540 A | 6/1998 | White |
| 5,764,874 A | 6/1998 | White |
| 5,790,734 A | 8/1998 | Stumpf |
| 5,820,250 A | 10/1998 | Betts et al. |
| 5,842,060 A | 11/1998 | White et al. |
| D402,772 S | 12/1998 | Lodhie |
| 5,850,126 A | 12/1998 | Kanbar |
| D404,506 S | 1/1999 | Lodhie |
| D405,201 S | 2/1999 | Lodhie |
| 5,877,899 A | 3/1999 | Stern et al. |
| 5,887,102 A | 3/1999 | Mueller et al. |
| 5,897,195 A | 4/1999 | Chote |
| 5,920,643 A | 7/1999 | White et al. |
| D413,401 S | 8/1999 | McDonald et al. |
| 5,949,584 A | 9/1999 | White et al. |
| D414,887 S | 10/1999 | McDonald et al. |
| 5,997,164 A | 12/1999 | Betts et al. |
| 6,003,992 A | 12/1999 | Bergeron Dunn et al. |
| 6,028,694 A | 2/2000 | Schmidt |
| 6,059,421 A | 5/2000 | White et al. |
| 6,095,661 A | 8/2000 | Lebens et al. |
| 6,135,350 A | 10/2000 | White et al. |
| D434,510 S | 11/2000 | Lodhie |
| D436,200 S | 1/2001 | Cheong et al. |
| 6,168,288 B1 | 1/2001 | St. Claire |
| 6,177,954 B1 | 1/2001 | Bouvier |
| 6,200,134 B1 | 3/2001 | Kovac et al. |
| 6,220,719 B1 | 4/2001 | Vetorino et al. |
| 6,220,722 B1 | 4/2001 | Begemann |
| 6,231,207 B1 | 5/2001 | Kennedy et al. |
| 6,234,645 B1 | 5/2001 | Börner et al. |
| D445,926 S | 7/2001 | Cheong |
| 6,267,492 B1 | 7/2001 | Reid et al. |
| 6,268,702 B1 | 7/2001 | Fleck |
| 6,276,822 B1 | 8/2001 | Bedrosian et al. |
| 6,283,613 B1 | 9/2001 | Schaffer |
| 6,290,382 B1 | 9/2001 | Bourn et al. |
| 6,331,062 B1 | 12/2001 | Sinclair |
| 6,366,028 B1 | 4/2002 | Werner et al. |
| 6,398,383 B1 | 6/2002 | Huang |
| 6,402,340 B1 | 6/2002 | Sharrah et al. |
| 6,402,347 B1 | 6/2002 | Maas et al. |
| 6,485,160 B1 | 11/2002 | Sommers et al. |
| 6,491,409 B1 * | 12/2002 | Sharrah et al. ............. 362/206 |
| 6,511,203 B1 | 1/2003 | Winther |
| 6,511,214 B1 | 1/2003 | Parsons et al. |
| 6,536,912 B1 | 3/2003 | Parker |
| 6,639,716 B1 | 10/2003 | Tomofuji |
| 2002/0067608 A1 | 6/2002 | Kruse et al. |
| 2002/0149930 A1 | 10/2002 | Parker |
| 2002/0196620 A1 | 12/2002 | Sommers et al. |

* cited by examiner

SOLID STATE LIGHT SOURCE

RELATED APPLICATION

This application is a continuation-in-part of and claims the benefit of U.S. Pending application Ser. No. 10/263,922 entitled "Solid State Light Source" filed Oct. 3, 2002 now U.S. Pat. No. 6,957,905 which is incorporated herein by reference in its entirety, and which claimed the benefit of U.S. patent application Ser. No. 60/326,802 entitled "Solid State Light Source" Filed Oct. 3, 2001 which is also incorporated herein by reference in its entirety.

BACKGROUND OF THE INVENTION

1. Field of the Invention

The present invention relates to a solid state light source, and more particularly, to a modular light source using at least one light emitting diode element(s) (LED elements) arranged in a tubular sealed housing.

2. Brief Description of the Prior Art

Specialized light sources have been developed in numerous industries. For example, light sources utilizing fiber optic bundles have been used by machine vision engineers for years to put light just where it is needed. Fiber enables the engineer to generate the precise lighting geometries required to perform difficult inspections. Halogen sources have been a mainstay to illuminate these fiber optic bundles. However, the typical halogen source suffers several shortcomings and was not designed for use on the factory floor. The light from a fresh halogen lamp is brilliant; but, output declines steadily over the lamp's relatively short (typically) 1000 hour life. In addition, a typical halogen lamp consumes 150 watts of power and generates a tremendous amount of heat. Consequently, the typical halogen lamp light source is not a sealed, shock resistant unit because ventilation is required. Due to these design considerations, present product offerings are housed in heavy, bulky enclosures.

In addition to use as a light source for the purpose of illumination, LED elements are also commonly used for information display such as LED element display panels, "power on" indicators and the like. Within the meaning of this application, a light source is a lighting device used for illumination. An LED element used for the purpose of information display, also called signalling, will typically be on the order of less than one hundred (<100) milli-candela whereas an LED element used for illumination will typically be on the order of at least one thousand (>1000) milli-candela. Consequently, there is a large distinction in the industry between LED based light sources and LED based signalling or display devices.

Advances in LED technology have prompted a number of well-known manufacturers in the machine inspection industry to introduce products to eliminate not only the halogen source but the fiber optic bundle as well. Lines, rings, and panels which were once strictly the domain of fiber optics are now being populated with LED elements. Other specialty units such as on-axis and cloudy day illuminators are also available in LED form. At first glance, this appears to be a technically sound, cost-effective illumination alternative. While not as bright, LED technology offers features and capabilities unavailable with halogens. However, the illumination patterns generated from these products are generally poor and uneven because the individual LED elements produce hot spots that randomized fiber optic would have eliminated.

Northeast Robotics, Fostec, Illumination Technologies, & Dolan Jenner are representative of the companies in the machine vision illumination industry. Northeast Robotics is the assignee of U.S. Pat. Nos. 6,177,954; 6,135,350; 6,059,421; 6,003,992; 5,949,584; 5,920,643; 5,877,899; 5,842,060; 5,764,874; 5,761,540; 5,713,661; 5,684,530; 5,604,550; 5,461,417; and 5,187,611. Fostec is the assignee of U.S. Pat. Nos. 5,887,102 and 5,187,765. Illumination Technologies is the assignee of U.S. Pat. Nos. 5,752,767; 5,661,838; 5,591,972; 5,550,946. Dolan Jenner is the assignee of U.S. Pat. Nos. 5,997,164; 5,820,250; 5,790,734; 5,579,177; 5,276,504; RE34,345; 5,229,842; 5,102,227; 4,772,128; and 4,280,122.

There still remains a need in the machine vision industry for a durable, low cost, low power, light source providing effective lighting to the desired location. This need is not limited to the machine vision industry. Durable, low cost, low power, light source providing effective lighting to the desired location would also be particularly well-suited for portable light sources such as flashlights, bicycle lights, helmet lights; hand-held lanterns and the like. Regarding flashlights and the like, Mag Instruments is the assignee of U.S. Pat. Nos. D336,535; D335,718; 5,193,898; 5,184,884; and 5,062,026. The Brinkmann Corp. is the assignee of U.S. Pat. Nos. D445,926; D436,200; D414,887; and D413,401. Ledtronics is the assignee of U.S. Pat. Nos. D434,510; D405,201; D404,506; and D402,772.

In a similar fashion, a durable, low cost, low power, light source providing effective lighting to the desired location would also be well-suited for other specific lighting areas such as outdoor lighting, back up or emergency lighting, interior vehicle lighting and numerous other applications. LED light sources have been proposed in a number of areas, but have not yet adequately addressed all of the lighting criteria. See for example U.S. Pat. Nos. 6,290,382 (LED vision system); U.S. Pat. No. 6,283,613 (LED traffic light); U.S. Pat. No. 6,276,822 (LED headlight); U.S. Pat. No. 6,268,702 (LED warning light); U.S. Pat. No. 6,234,645 (LED white light); U.S. Pat. No. 6,220,722 (LED white light for airplane cabin); U.S. Pat. No. 6,220,719 (LED flashlight); U.S. Pat. No. 6,168,288 (LED flashlight); U.S. Pat. No. 6,095,661 (LED flashlight); 6,639,716 (LED light); U.S. Pat. No. 6,028,694 (LED light); U.S. Pat. No. 5,897,195 (LED light); U.S. Pat. No. 5,850,126 (LED light); U.S. Pat. No. 5,634,711 (LED light); U.S. Pat. No. 4,234,911 (LED flashlight); U.S. Pat. No. 4,211,955 (LED light).

It is an object of the present invention to provide a durable, low cost, low power, modular light source providing effective lighting to the desired location for a variety of specific applications. It is another object of the present invention to provide such durable, low cost, low power, light source providing effective lighting to the desired location effective for the machine vision illumination and usable as a fiber optic bundle lighting source. It is another object of the present invention to provide a light source that is economically manufactured and easily usable with a variety of applications.

SUMMARY OF THE INVENTION

The above objects are achieved with a light source according to the present invention. A modular light source includes a generally tubular housing, at least one LED element mounted in the housing, and an optional controller mounted in the housing and coupled to the LED element. The controller, if provided, may sequentially, intermittently pulse the LED element(s). The controller may over-drive the LED element(s) with a current in excess of several times the continuous forward rating for the individual LED element(s). The housing may be a substantially closed, waterproof tubular metal member and may include a power source in the housing.

In one embodiment of the present invention, the light source may form a portable light source, such as a flashlight, bicycle light, helmet light or the like. The light source may include at least one battery forming the power source in the housing and the housing may be formed as a substantially closed, waterproof, tubular member forming the portable light source.

In another embodiment of the present invention the light source may be of the type used in the machine vision area and include a fiber optic bundle coupling attached to the housing. The light source may include a collimating optic such as fresnel lens in the housing between the LED element(s) and the fiber optic bundle coupling. The light source may further include a collector or reflective mirror between the optic and the fiber optic bundle coupling. The housing may have a power source coupling. The light source may further include an intensity adjustment mechanism in the housing for adjusting the intensity of the LED element(s).

The light source according to the present invention may include a plurality of colors of LED elements in an LED array. The light source may have the LED array divided into channels of LED element pairs operated simultaneously. The light source may use 5 mm LED elements in the LED array, although other sizes and styles of LED elements, such as surfaces mounted chips, may be utilized depending on the desired application. The light source may provide the controller to evaluate the power source and control the LED array accordingly, thereby accepting a variety of input voltages. The controller may accept external strobe signals.

These and other advantages of the present invention will be clarified in the description of the preferred embodiments taken together with the attached drawings in which like reference numerals represent similar or related elements throughout.

BRIEF DESCRIPTION OF THE DRAWINGS

FIG. 4 a plan view of an LED array of the light source shown in FIG. 1;

DETAILED DESCRIPTION OF THE PREFERRED EMBODIMENTS

Figure 1:
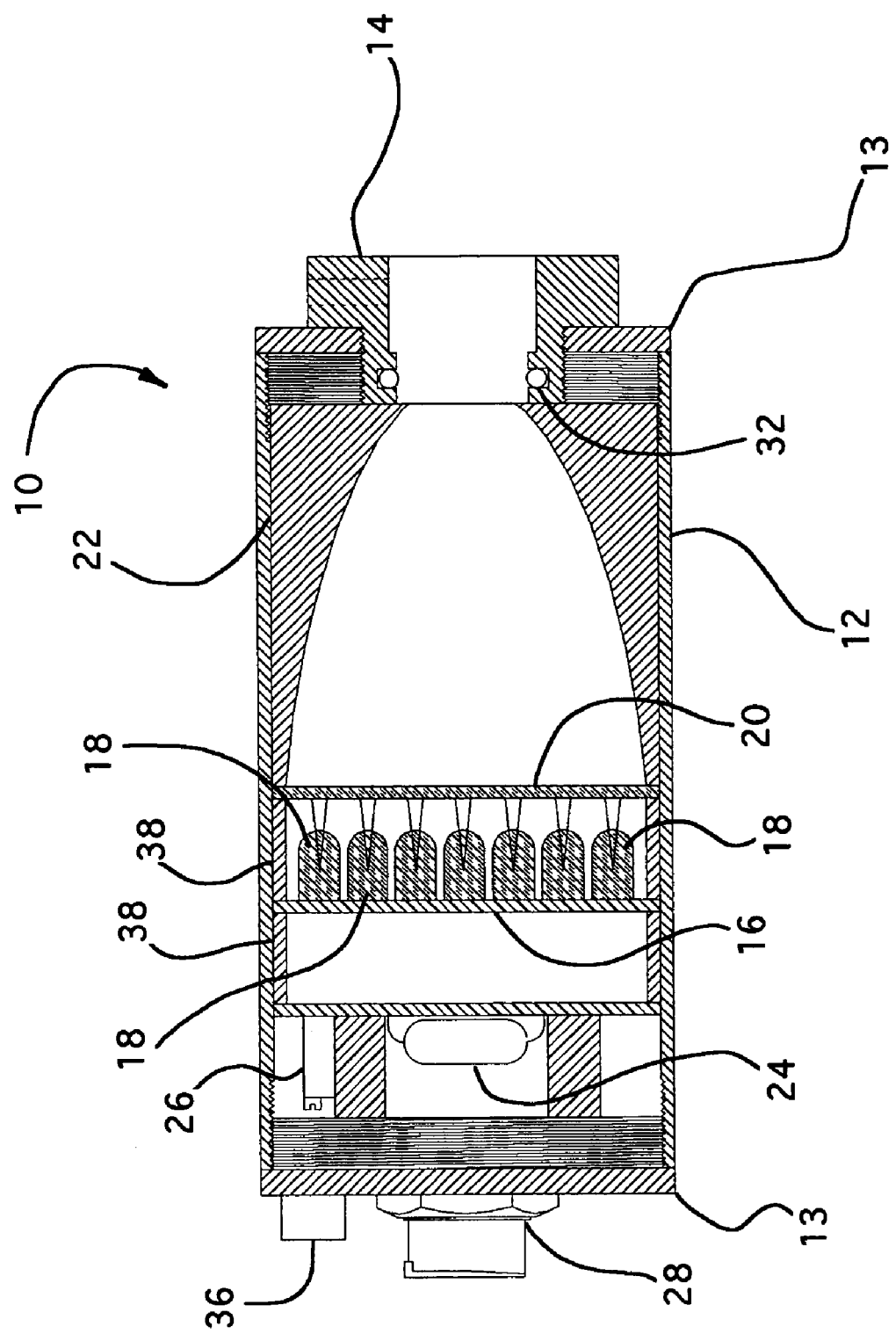
FIG. 1 is a sectional side view of a light source according to one embodiment of the present invention.
Figure 2:
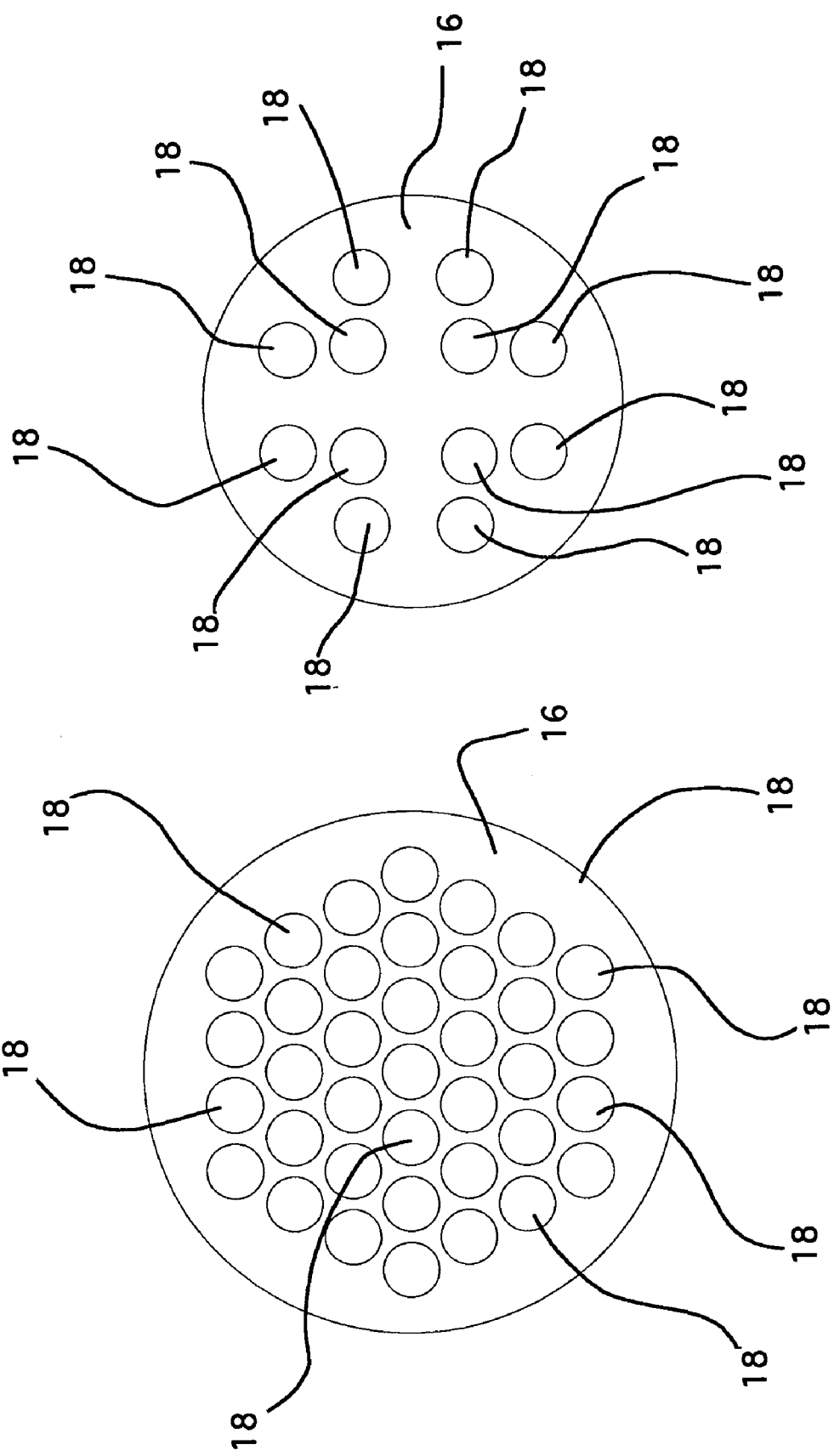
FIG. 2 is a plan view of an LED array of the light source shown in FIG. 1.

One embodiment of the present invention is shown in FIGS. 1–2. As shown in FIG. 1, the present invention is a modular light source 10 for illuminating a fiber optic bundle (not shown) such as used in machine vision illumination. The light source 10 includes a rigid, substantially closed tubular housing 12 formed of an anodized aluminium tube with threaded end caps 13 closing the threaded ends of the housing 12. Other materials, such as plastic or steel, may also be used to form the housing 12. One end cap 13 attached to the tubular housing 12 includes a conventional fiber optic bundle coupling 14 for receipt of an end of a fiber optic bundle in a conventional manner. The housing 12 can easily accommodate different couplings 14 simply by replacing the end cap 13 and coupling 14 with an end cap 13 having a different sized coupling 14, or threading a different sized coupler 14 into the end cap 13 such as may be possible with couplers 14 having a smaller inner diameter. This construction allows the light source 10 to be used with a variety of fiber optical bundles.

The light source 10 includes an LED array 16 formed of a plurality of individual LED elements 18 as shown in FIG. 2. The LED elements 18 maybe formed in a variety of colors. The LED elements 18 may be 5 mm elements, since these effectively balance the light emitted or brightness with the population density, size and cost. However, any size or style LED element 18 may be used based upon the desired use of the light source 10. For example, chip style surface mount elements may also be utilized in certain applications. The LED elements 18 may be grouped into pairs on the LED array 16. LED elements 18 are available in many sizes and colors. In addition, the 5 mm LED elements 18 (and other sized LED elements 18) are available in many emitting wavelengths. This is important because the LED array 16 may be populated with LED elements 18 of any color or wavelength. A single LED array 16 may, in fact, be populated with LED elements 18 emitting different wavelengths for the purpose of switching or mixing colors to achieve a desired result. Typical colors and their associated wavelengths include Red (635 nm), Amber (620 nm), Yellow (590 nm), Green (525 nm), Blue (470 nm), White (420–700 nm) and Infrared (880 nm). The actual construction of the LED array 16 is believed to be known to those in the art.

A collimating optic 20, such as a fresnel lens, is positioned adjacent the LED array 16 to assist in focusing the light from the LED array 16 onto the fiber optic bundle in the coupling 14. A reflective optic 22, such as a chrome plated brass mirror, is positioned between the optic 20 and the coupling 14 to further assist in the transmission of the maximum amount of uniform light to the fiber optic bundle in the coupling 14. Optical components positioned in front of the LED array 16 (i.e. optics 20 and 22) are used to enhance the luminous efficiency of the light source 10 by gathering and directing light emitted from the LED array 16 to the end of the optical fiber bundle. Specifically, the fresnel lens of optic 20 is used to focus the parallel rays onto the bundle. The end of the bundle is positioned inside the focal point of the optic 20 since a sharp focus is not desirable. A soft focus bathes the entire bundle in a circle of light. In addition, the elliptical mirror of reflective optic 22 is employed to gather oblique rays and direct them to the fiber bundle.

A controller 24, shown schematically in FIG. 1, is positioned in the housing 12 and coupled to the LED array 16 for controlling the individual LED elements 18. It is preferred if the controller 24 operates the LED array 16 such that each pair of LED elements 18 is pulsed in a sequence similar to the firing order of an internal combustion engine. Rapid pulsing of the LED elements 18 will further maximize light output by driving the LED elements 18 with current several times in excess of the manufacturer's continuous forward rating. The LED elements 18 are allowed to cool during the rest portion of the cycle to prevent damage. The net effect is a brighter light with lower energy consumption than if the LED array 16 was powered in a continuous current mode. The specific amount of the over driving of the individual LED elements can be determined based upon the given application; however, at least three (3) times the continuous forward rating is expected and six (6) to eight (8) times the given rating (or even more) is contemplated. The construction of the control board or controller is only shown schematically and is believed to be known to those in the art. Any number of specific control circuit boards may be designed to accomplish the desired functionality, including the pulsing and over driving discussed above, strobing of the LED array 16, color mixing or other control functions. The controller 24 located behind the LED array 16 serves multiple roles. First, it regulates the power to the LED array 16. Power is normally provided by an external 5 VDC wall mount supply. However, the control board or controller 24 is capable of accepting a wide range of input voltages. The controller 24 will evaluate the power source supplied and control the LED array 16 accordingly to provide a constant light output with a range of voltage power inputs. This permits, within a reasonable range, the use of whatever power is available. The light source 10 can even be battery powered if necessary. Another part of its circuitry controls the pulsing function of the LED array 16 and accepts an external strobe signal. The controller 24, or control board, also controls the intensity of the LED array 16. A multi-turn potentiometer 26 is coupled to the controller 24 and is accessible through the rear end cap 13 and allows manual adjustment of LED array 16 brightness. The design of the specific controller 24, as with the LED array 16, will depend on the specific application of the light source 10.

One end cap 13 attached to the housing 12 includes a power coupling 28 for connection to an external power source (not shown) through a power cord (not shown). As discussed above, the light source 10 may be used with a battery source as well, with the battery source coupled to the housing 12 through the power coupling 28. The battery source may, alternatively, be positioned within the housing 12.

The present invention generally relates to the generation of light (e.g., illumination) whereby the emitting LED elements 18, control circuitry in the controller 24, and associated optical components are housed within a modular rugged, sealed tube forming the housing 12. This embodiment of the invention is basically summarized as a "light in a pipe". The structural shape of the housing 12 permits the easy alignment of key components along an optical axis while simultaneously providing the protective, sealed housing 12 necessary for the survival of those components in a hostile or adverse environment. It has been designed to provide illumination in situations that require a compact, lightweight source; extreme durability; long, reliable emitting life; low power consumption; minimal heat generation; and special illumination controls (e.g., intensity, color mixing, strobing).

As machine vision engineers, the inventors, Mr. Donald V. Pritchard and Mr. William J. Magiske, have developed a new modular light source 10 that combines LED technology with the benefits of fiber to provide superior illumination in a very rugged, compact package. The light source 10 generates light from the LED array 16. The light is then collected and focused onto the end of a fiber bundle. All components are housed in a small tube forming the housing 12 that can be mounted in any orientation. Low power consumption of the LED array 16 means that no cooling is required. The housing 12 is sealed and water-resistant. The use of LED elements 18 makes the light source 10 shock resistant because there are no filaments or moving parts that can fail. In fact, the LED array 16 has a rated life of 100,000 hours. The LED elements 18 are available in a variety of wavelengths including infrared. The light source 10 can accommodate a fiber bundle from any manufacturer by changing the coupling 14 on the front of the housing 12. Another benefit of the light source 10 is that it can be strobed, eliminating the need for expensive strobing units that will degrade over time. In summary, the effort has been to develop a rugged light source 10 that combines the functionality of both traditional halogens and gas discharge strobes for the illumination of fiber without the associated drawbacks.

The light source 10 uses rigid tubing as its housing 12 as discussed above. This simple structural shape was chosen for several reasons. Housing 12 is produced with minimal machining and at very little cost. The tube itself is rugged. A tube permits the easy alignment of key components along an optical axis while simultaneously providing a protective housing 12. Assembly is quick and easy because all electrical and optical components are slipped into the tube. Proper internal component separation may be easily maintained with spacer tubes 38. Screw on end caps 13 seal the housing 12. Power is provided through a waterproof connector or power coupling 28 on the rear end cap 13. An external strobe trigger signal can also be applied through this coupling 28. The light source 10 accommodates fiber optic bundles from different manufacturers by attaching the appropriate coupler 14 to the front end cap 13 of the housing 12.

Engineers have always been forced to choose between a continuous light source such as a halogen or a gas discharge strobe to illuminate the optical fiber used in machine vision inspection systems. The light source 10 functions as both. No other product fulfils these dual roles. The light source 10 has been designed to be versatile, rugged, and energy efficient. The light source 10 uses the LED array 16 to illuminate optical fiber. No existing product on the market known to the inventors does this. Other LED products are used in lieu of optical fiber and can produce uneven illumination patterns as a result. The light source 10 can illuminate optical fiber in either continuous or strobed modes. Typically, a halogen source is purchased for continuous illumination of fiber or a gas discharge strobe for pulsed illumination. No known existing product on the market does both. The light source 10 can be provided with an LED array 16 which emits light in a variety of colors including infrared and ultraviolet. Other light sources must employ a filter to absorb unwanted colors. The light source 10 produces a cool light. It consumes only 4 watts of power. In contrast, halogen sources generate a tremendous amount of heat while consuming 150 watts. The LED elements 18 used in the LED array 16 have a rated life of 100,000 hours. In contrast, halogen bulbs typically last for 1000 hours. Gas discharge flash tubes have a life of 6 million cycles. The light output of the LED array 16 is constant throughout is rated life. The output from halogens and flash tubes degrades over the life of the bulb. The light source 10 uses the fresnel lens of optic 20 and elliptic mirror of optic 22 in tandem to focus and direct light from the array 16 to the fiber bundle. Other products do not employ similar components. The light source 10 is compact, rugged, and highly water-resistant. The typical halogen or strobe source must be housed in bulky, expensive enclosures to survive in rigorous factory environments. The light source 10 will operate on a wide range of input voltages. Other sources typically require a very specific input voltage such as 120 VAC or 24 VDC.

The ramifications of the present technology extend beyond the machine vision market. Specifically, the overall design concept lends itself to performance enhancements in products for outdoor, safety, emergency, and portable illumination applications. These include flashlights, headlamps, lanterns, etc. At present, these products typically employ tungsten, krypton, xenon, and halogen bulbs. The glowing filaments in these bulbs consume a significant amount of power and also generate considerable heat. Battery life with these products is measured in hours. In addition, filaments are somewhat fragile and will break with sufficient shock.

While originally developed as an illumination source for the optical fiber used in industrial machine vision systems, the present invention lends itself very nicely to illumination issues within a number of very diverse markets. Where one or more of the aforementioned parameters is of paramount importance, the invention is an appropriate and preferred solution. The concept and overall design have application for portable, safety, marine, emergency, and outdoor lighting. Variations of the invention for these applications include flashlights for emergency and military personnel as well as general purpose use; headlamps for miners, construction workers, spelunkers, and cyclists; bicycle lighting for mountain bikers and cycle mounted police; lanterns for campers, boaters, and homeowners; cockpit lighting for boats and pleasure craft; and solar powered safety and decorative outdoor lighting. The following description, in connection with the illustrated embodiments, demonstrates the wide range of applicability of the present invention.

Figure 3:
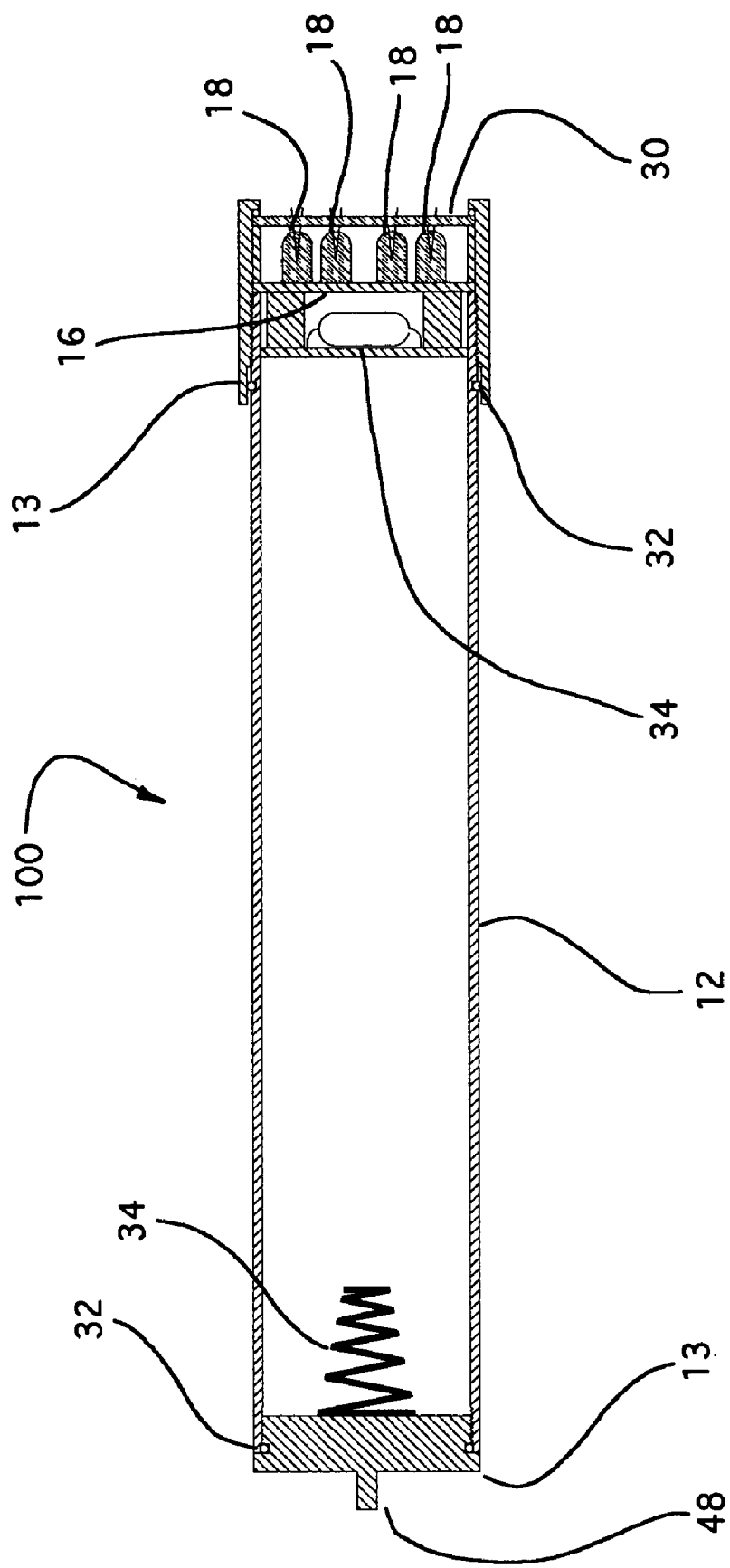
FIG. 3 is a sectional side view of a light source according to a second embodiment of the present invention.

FIGS. 3–4 illustrate the formation of a light source 100 according to another embodiment of the present invention, specifically in the form of a portable flashlight. The light source 100 of FIGS. 3–4 is similar to the light source 10 of FIGS. 1–2 including a housing 12 and an LED array 16 of LED elements 18 with controller 24 in the housing 12. A window 30 in front end cap 13 replaces the collimating optic 20 to seal the housing 12. The housing 12 of the light source 100 of FIGS. 3–4 differs from the housing 12 of the light source 10 of FIGS. 1–2 by providing for the receipt of one or more batteries therein as the power source. The front end cap 13 is internally threaded onto the tubular housing 12 through external threads on the tubular housing 12. The front end cap 13 may include a sealing member 32, such as an O-ring, to seal the light source 100. The rear end cap 13 may include a sealing member 32 and a biasing contact 34 as known in the flashlight art. Appropriate switching (not shown) will be provided in the housing 12 as is known in the flashlight art.

The flashlight light source 100 of FIGS. 3–4 provides several advantages over existing flashlights. The light source 100 uses the LED array 16 to generate a substantial amount of light, particularly through the pulsing and over driving of the LED elements 18. In contrast, most existing flashlights use tungsten or krypton bulbs. Existing LED flashlights are available, but do not pulse or over drive the LED elements to provide acceptable light emission. The LED array 16 generates very even illumination patterns with no special optical components. Traditional flashlights use a parabolic reflector to collect and direct the light. Reflectors can create interference patterns of concentric rings of light that can be very annoying to the users. Even premium flashlights from manufacturers, such as Mag Instruments, suffer this problem. The use of the LED elements 18 consumes far less power than traditional flashlight bulbs of similar output. This translates into exceptional battery life. The light source 10 may pulse the LED array 16 to maximize light output while extending battery life. For example the light source 10 with a twelve LED element array 16, as shown in FIG. 4, can generate useful light non-stop for two weeks on 3 D-cell batteries. No existing commercial flashlight on the market can match this performance. Since the LED array 16 is comprised of several pulsed channels, it can be provided in dual or even multiple colors. This has ramifications for military applications. The soldier in the field uses screw on filters to get the color he needs in conventional flashlights. The light source 100 can obviate this through colored LED elements 18. No known flashlight on the market currently provides this feature. The light source 100 is designed to operate over a wide range of voltages. This allows the user to utilize whatever batteries are available. No commercial flashlight on the market is believed to have this capability. The typical LED element 18 has a rated life of 100,000 hours and is extremely shock-resistant. In contrast, the typical flashlight bulb has a life of a few hours and is easily damaged. The embodiments of FIGS. 5–31 will further evidence the advantages of the present invention regarding flashlight type lighting sources.

The present invention is also particularly well-suited for use as headlamps or helmet lights. The headlamp can be formed similar to light source 100. The remote power source may be a battery, or battery pack, clipped to the user, such as to the user's belt. Headlamps which use an LED array 16, or single element 18, according to the invention will generate a substantial amount of light with relatively low power consumption. In contrast, manufacturers of headlamps for the mining and construction industries use high intensity incandescent bulbs that consume a significant amount of power. Headlamps using LED arrays 16 or a single LED element 18 consume far less power than traditional units and will extend battery life over traditional units. Headlamps according to the present invention will operate for days on a single charge. Traditional units have a 10 to 14 hour run time and must be recharged daily. No headlamps on the market can match the performance of the present invention. Further, low power consumption also translates into smaller, lighter battery packs. The typical existing miner's headlamp weighs about 4 pounds. The battery pack for existing miner's headlamp weighs an additional 4 to 5 pounds and hangs from the belt like a large brick. Headlamps according to the present invention operate with small, light weight batteries minimizing these issues. The LED arrays 16 generate very even illumination patterns with no significant optical components. Traditional headlamps use a parabolic reflector to collect and direct the light. As discussed above, the light source of the present invention is designed to operate over a wide range of voltages. This permits the use of whatever batteries are available. No headlamp on the market does this. Further, the typical LED element 18 has a rated life of 100,000 hours and is extremely shock-resistant. In contrast, the typical headlamp bulb has a life of a few hundred hours and is easily damaged. The embodiments of FIGS. 32–33 will further evidence the advantages of the present invention as a user mounted headlamp.

The present invention is also particularly well-suited for the formation of lanterns, which can be viewed as a sub-set of flashlights in general, for all of the reasons discussed above. These LED lanterns would be designed for camping, backyard, and marine activities. Further, it has been noticed that the cool light from the LED array does not attract bugs. Finally, the bluish white light from the LED array 16 tends to fluoresce fishing line making it easier for night time fishermen to thread their lures. It also provides the right amount of light in the boat cockpit without harming night vision. Further lantern specific applications will be discussed below.

Another application of the present invention is in bicycle lights. That will also incorporate the aforementioned characteristics of superior illumination, long battery life, and ruggedness. Further, the light from the LED array 16 will cast fewer shadows, especially in wooded areas, giving the rider better three dimensional recognition capabilities. The light weight of both the light source 10 and 100 and batteries are beneficial to weight conscious cyclists. Finally, police cyclists can also rely on the light's ability to change colors and strobe, giving the cyclist headlight, safety, and warning light capability from one unit.

The present invention is not limited to high intensity white LED elements 18 that are driven with special circuitry in conjunction with optical components to gather and direct the emitted light into a fiber bundle. The proposed outdoor, safety, and portable illumination product designs (flashlights, headlamps, and lanterns) are subsets of the original solid state fiber optic light source 10. They may retain the same circular LED arrays 16 (or single high output LED element 18 as illustrated below), drive circuitry in the controller 24, and rigid housing 12. The optical components 20 and 22 used in the fiber optic light source 10 are traded for sealed windows 30 in the flashlight light source 100. The various embodiments of the present invention share the same cylindrical housing shape, use LED arrays, share the same electronic circuitry to pulse the array (if desired), and accept a wide range of input voltages. The present invention is not limited to use of LED arrays 16 as will be evident below.

In review, the design of the present invention, is a solid state light source including a tubular aluminium housing 12 enclosing an LED light source. The emitting end of the light source includes an end cap 13 designed for the light source function, where the LED light source member may be coupled to the end cap 13. An appropriate power source, such as an electrical plug or a battery pack in the housing 12 is also provided. The modular LED light source system of the invention provides a large variety of distinct light sources that are formed by common elements. As detailed below, a number of distinct light sources are provided with distinct end caps 13 selectively attached to a common housing 12. The LED element 18, or array 16, itself may be coupled or attached to the end cap 13 to be positioned in and removed from the housing 12 with the specific end cap 13.

Figure 5:
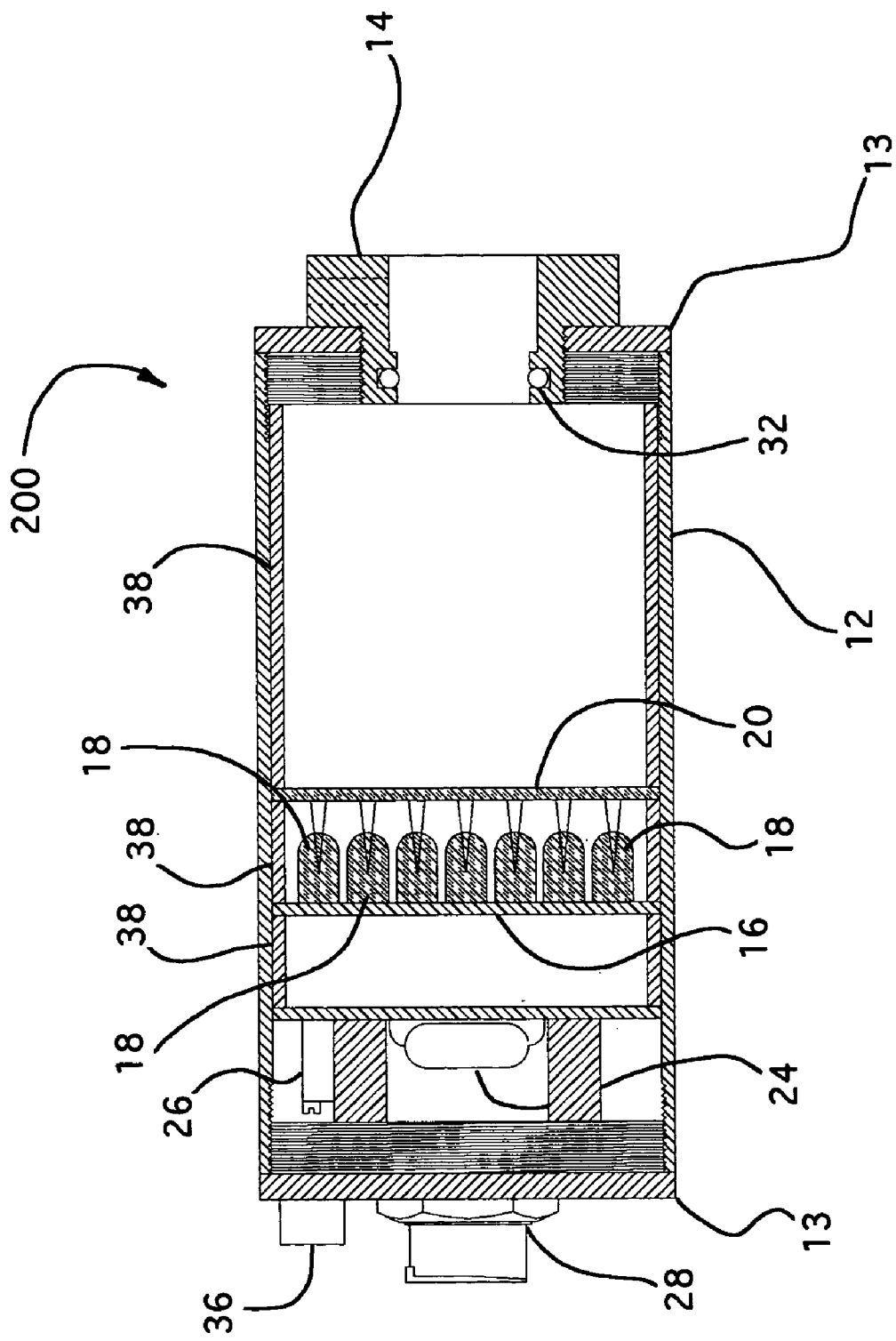
FIG. 5 is a sectional side view of a light source according to another embodiment of the present invention.

FIG. 5 illustrates a light source 200 essentially the same fiber optic light source 10 of FIG. 1. The light source 200 uses the same elements as the light source 10 without the optic 22. The removal of the reflective optic 22, i.e. mirror, can be easily accomplished through the disconnecting of the front end cap 13, removing the optic 22 and replacing the front end cap 13. The light source 200 also shows an access port 36 in the rear end cap to access the adjustment 26. The coupling 14 is also shown with a sealing member 32 to assist in fiber optic bundle coupling. FIG. 5 also better illustrates spacer tubes 38 used to locate the elements within the housing 12.

Figure 6:
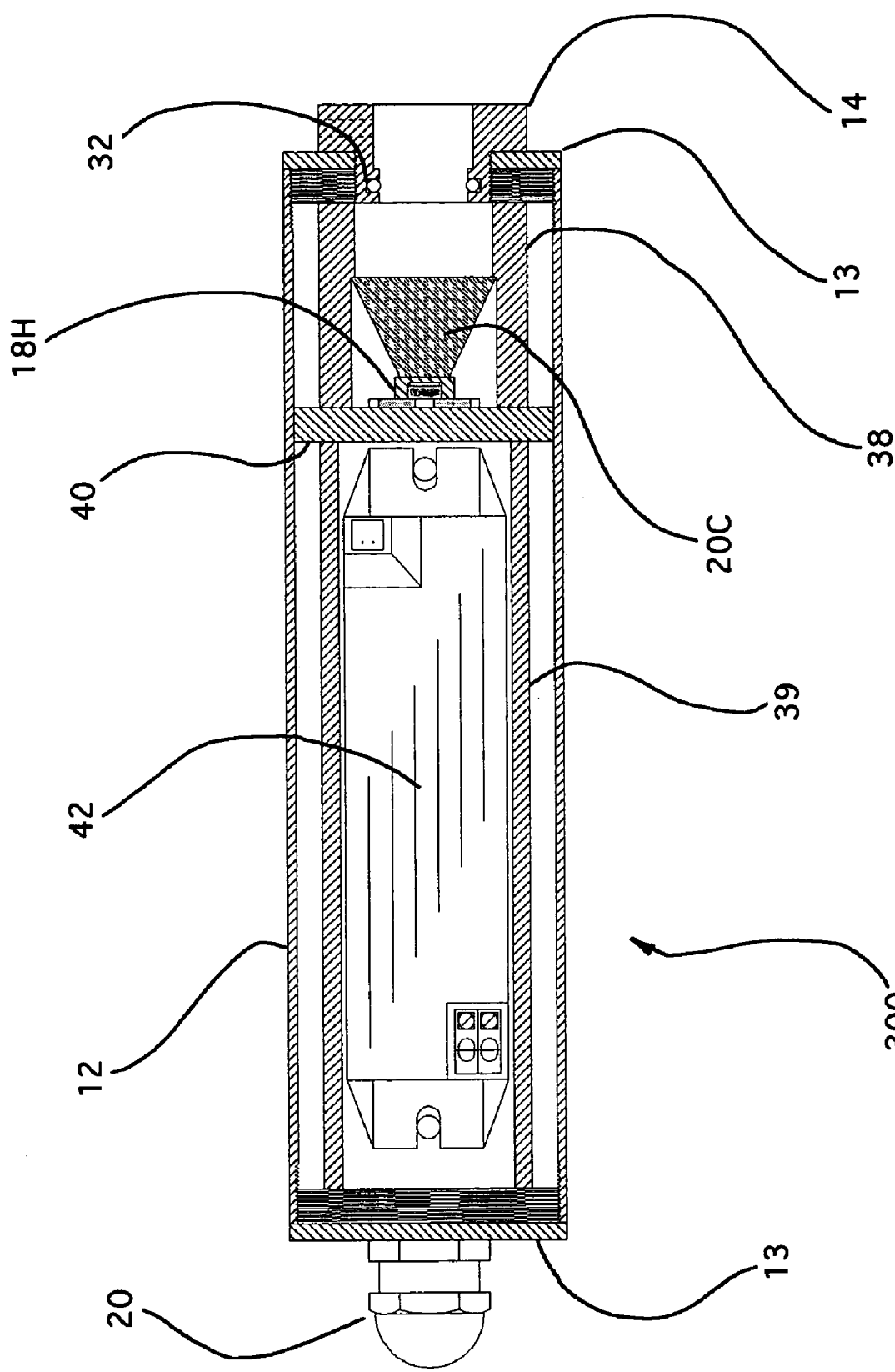
FIG. 6 is a sectional side view of a light source according to another embodiment of the present invention.

FIG. 6 illustrates a light source 300 similar to the fiber optic light source 200 of FIG. 5. The light source 300 uses the same housing 12, end cap 13, coupling 14, power connection 28 as the light sources 10 and 200. The light source 300 uses a single high output LED element 18H, wherein "high output" is at least a 1 Watt element within the meaning of this application. A conical collimating optic 20C is adjacent the LED element 18H. Suitable high output LED elements 18H are available from Lumiled Corporation. A spacer tube 38 spaces and holds a mounting plate 40 of the LED element 18H and the optic 20C from the front end cap 13. A power supply mount 39 is within the housing 12 to hold a power supply module 42 through which power is directed through the power coupling 28, e.g. a cord connector, mounted in the rear end cap 13.

Figure 7:
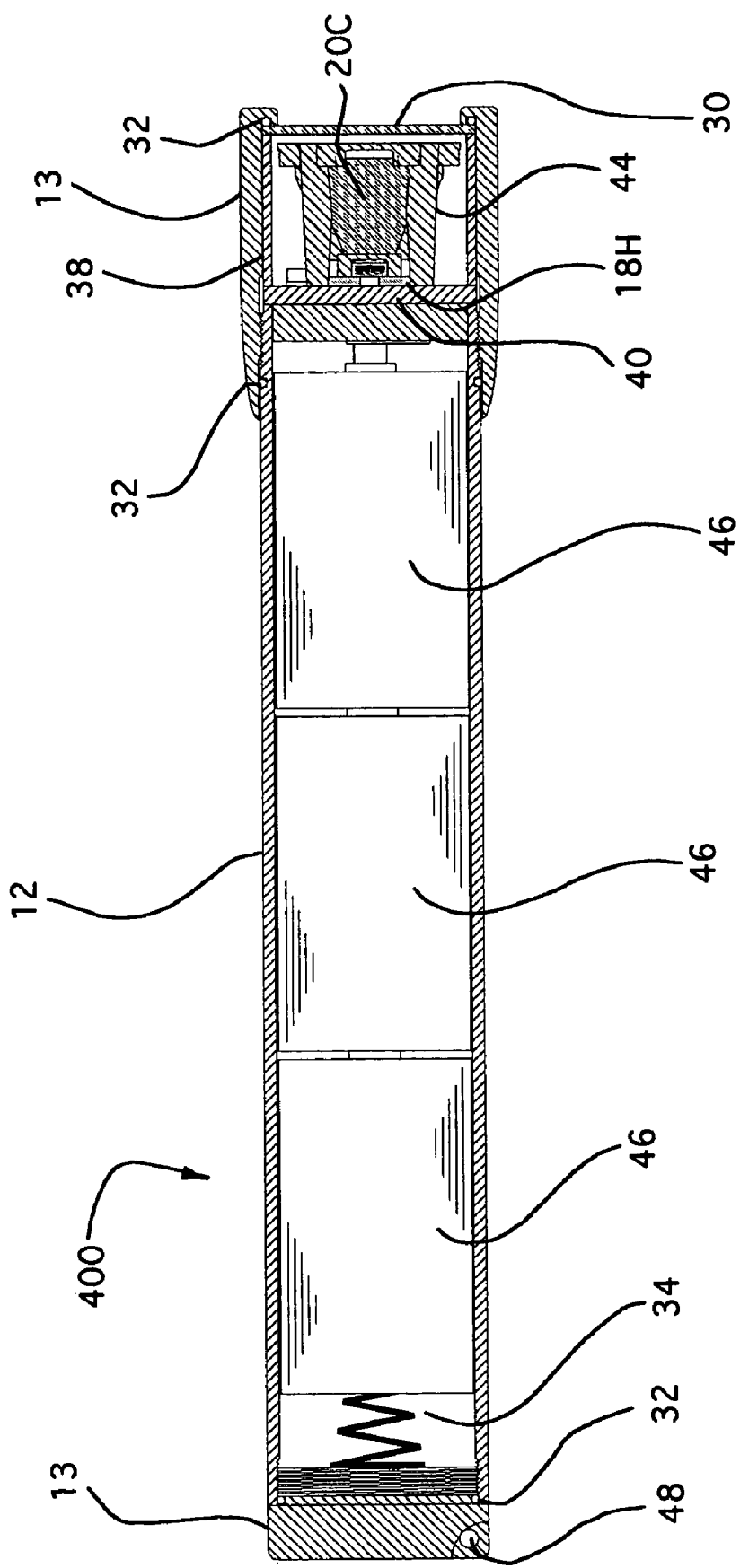
FIG. 7 is a sectional side view of a light source according to another embodiment of the present invention.

FIG. 7 illustrates a 3 D-cell fixed lens flashlight 400 according to the present invention. The flashlight 400 uses housing 12 and high output LED element 18H with optic 20C. The LED element 18H is in an end cap 13 with an optic mount 44 securing the optic 20C to the mounting plate 40. The front end cap 13 includes sealing members 32 and has a clear window 30. The window 30 may optionally be a lens, filter or the like. A spacer tube 38 spaces the mounting plate 40 of the LED element 18H appropriately. Rear end cap 13 includes a spring biasing contact 34 for D-cell sized batteries 46 in a conventional fashion. The rear end cap 13 may further include a mounting loop or support 48 for supporting of the light source or flashlight 400 (e.g. hanging from a users work-belt). The flashlight 400 will make the electrical connection through any conventional mechanism, including twisting of the end cap front end cap 13.

Figure 8:
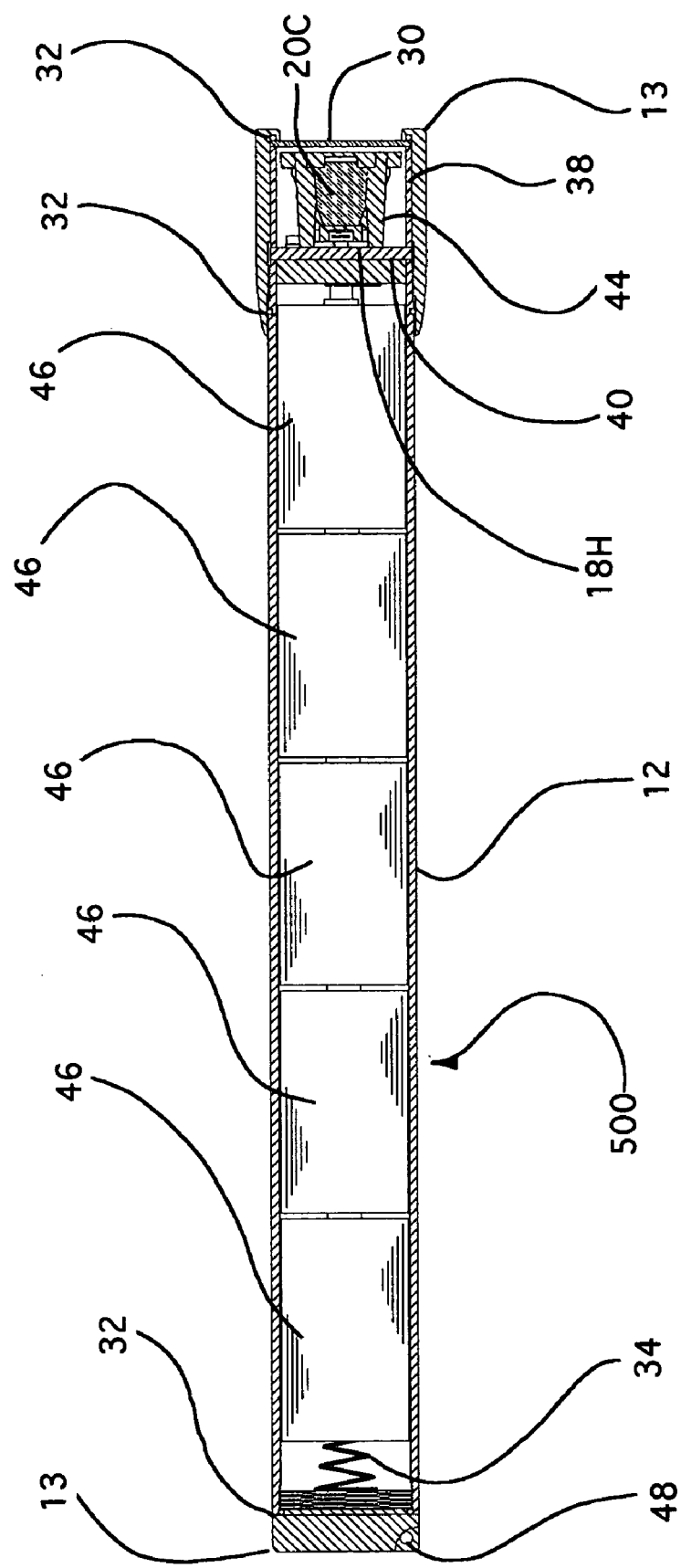
FIG. 8 is a sectional side view of a light source according to another embodiment of the present invention.

FIG. 8 illustrates a 5 D-cell fixed lens flashlight 500 according to the present invention. The flashlight 500 uses housing 12 which is long enough to accommodate 5 D-cell sized batteries 46. Other than the length of the housing 12 and the number of batteries 46, the flashlight 500 is the same as flashlight 400 discussed above.

Figure 9:
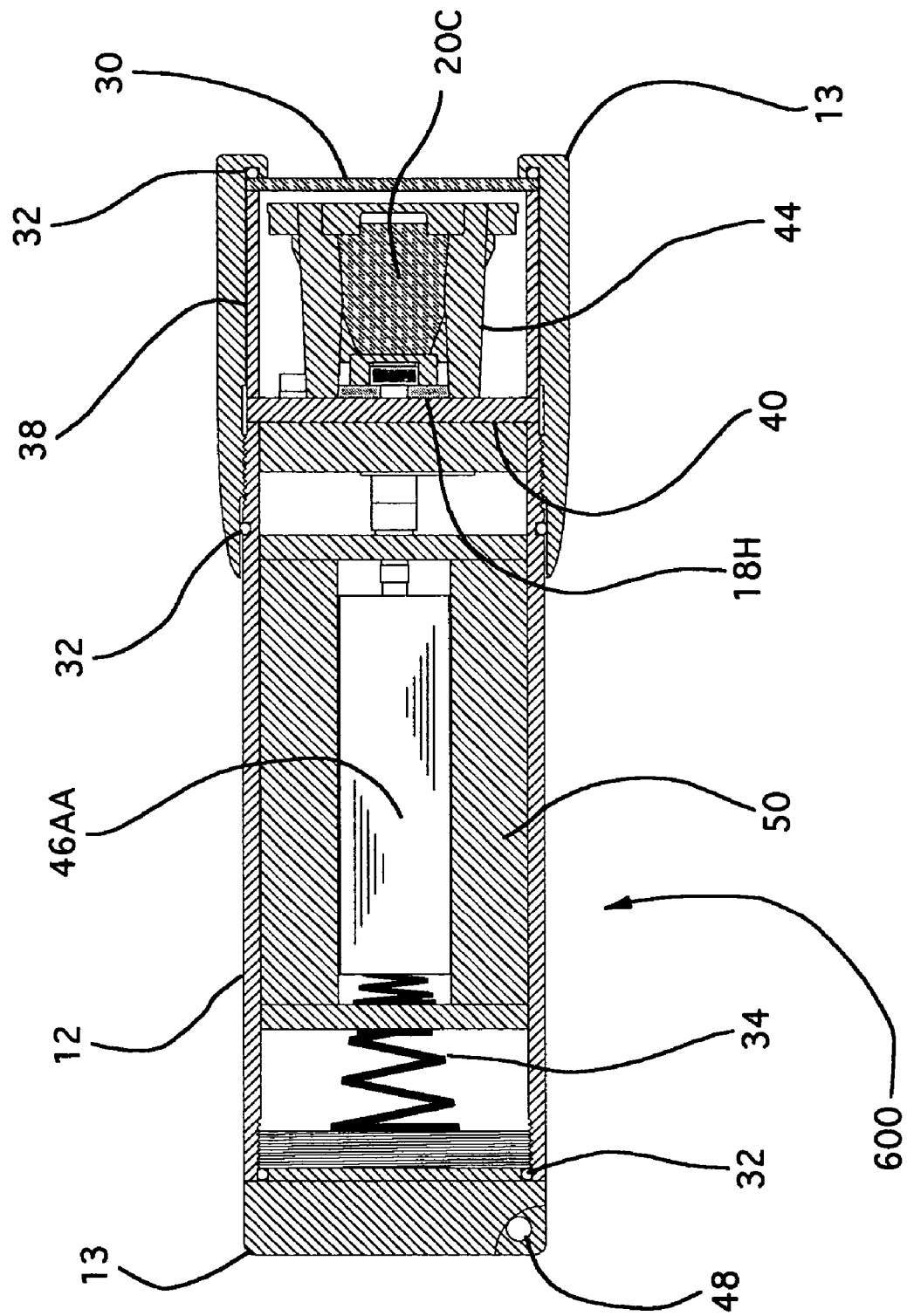
FIG. 9 is a sectional side view of a light source according to another embodiment of the present invention.

FIG. 9 illustrates a 3 AA-cell sized fixed lens flashlight 600 according to the present invention. The flashlight 600 uses housing 12 that is long enough to accommodate a battery holding tube 50 which houses 3 AA sized batteries 46AA in an annular array (i.e. the individual batteries are positioned 120 degrees apart in the battery holding tube 50). Other than the length of the housing 12, the battery holding tube 50 and the batteries 46AA, the flashlight 600 is the same as flashlights 400 and 500 discussed above.

Figure 10:
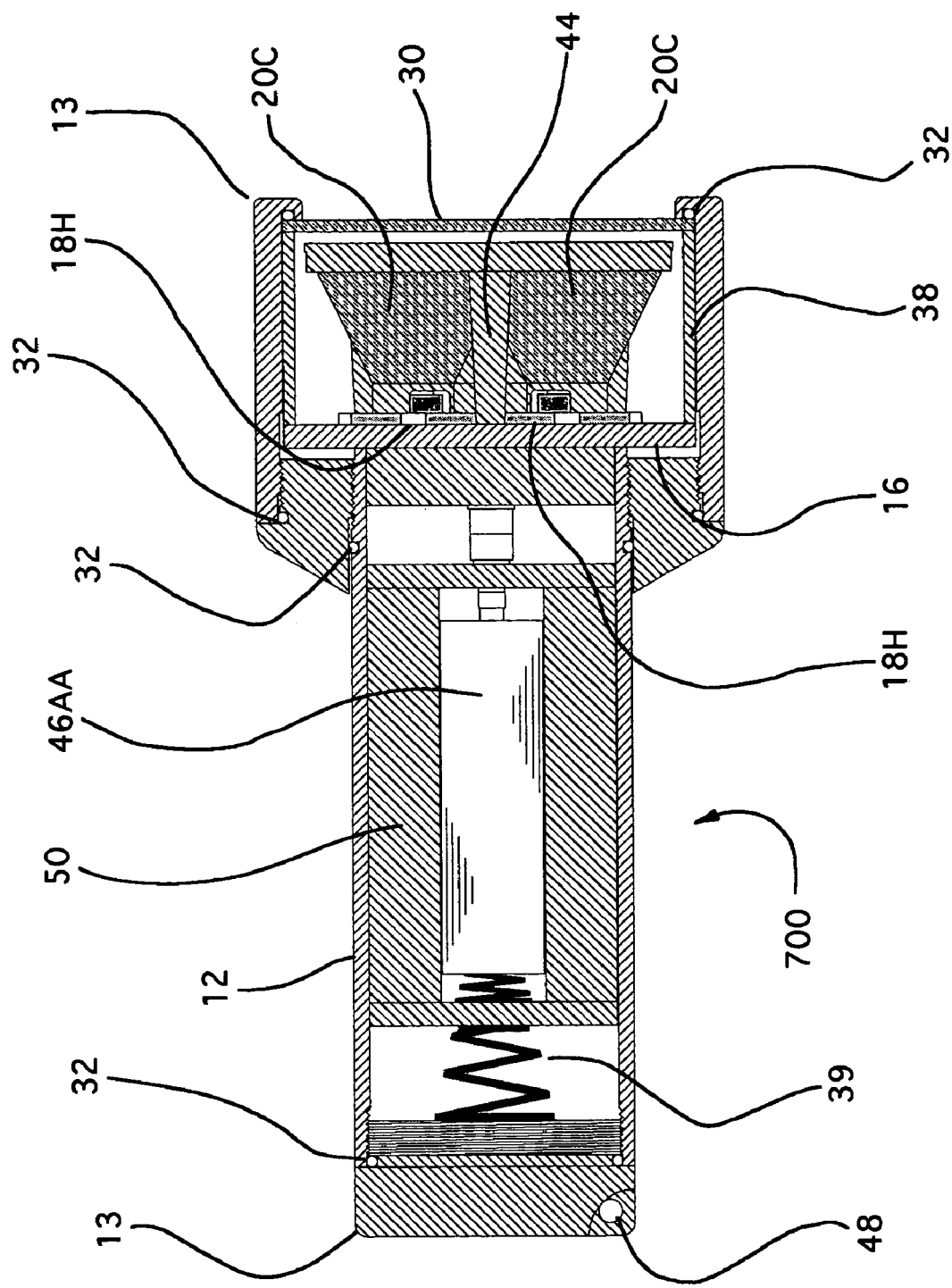
FIG. 10 is a sectional side view of a light source according to another embodiment of the present invention.

FIG. 10 illustrates a 3 AA-cell sized fixed tri-lens flashlight 700 according to the present invention. The flashlight 700 uses housing 12 with battery holding tube 50 housing 3 AA sized batteries 46AA in an annular array as discussed above in connection with FIG. 9. The flashlight 700 includes an end cap 13 having a window 30, spacer tube 38, LED array 16 and an array of three, preferably high output LED elements 18H with associated collimating optics 20C with mounting 44.

Figure 11:
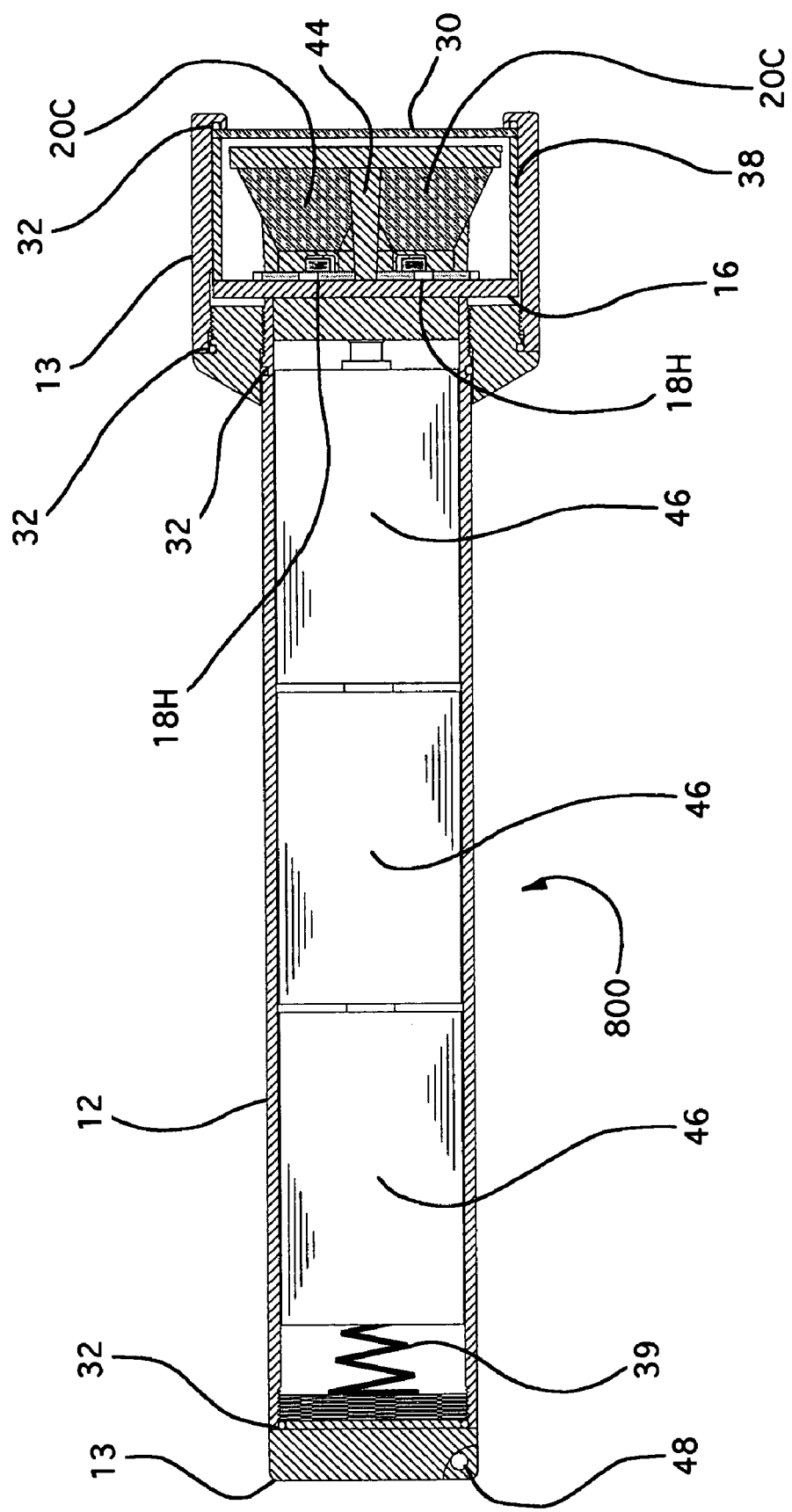
FIG. 11 is a sectional side view of a light source according to another embodiment of the present invention.

FIG. 11 illustrates a 3D cell sized fixed tri-lens flashlight 800 according to the present invention. The flashlight 800 is similar to the flashlight 400 with the end cap 13 thereof replaced with the end cap 13 used in flashlight 700. In other words the flashlight 400 can be converted to the flashlight 800 with replacement of the appropriate end cap 13.

Figure 12:
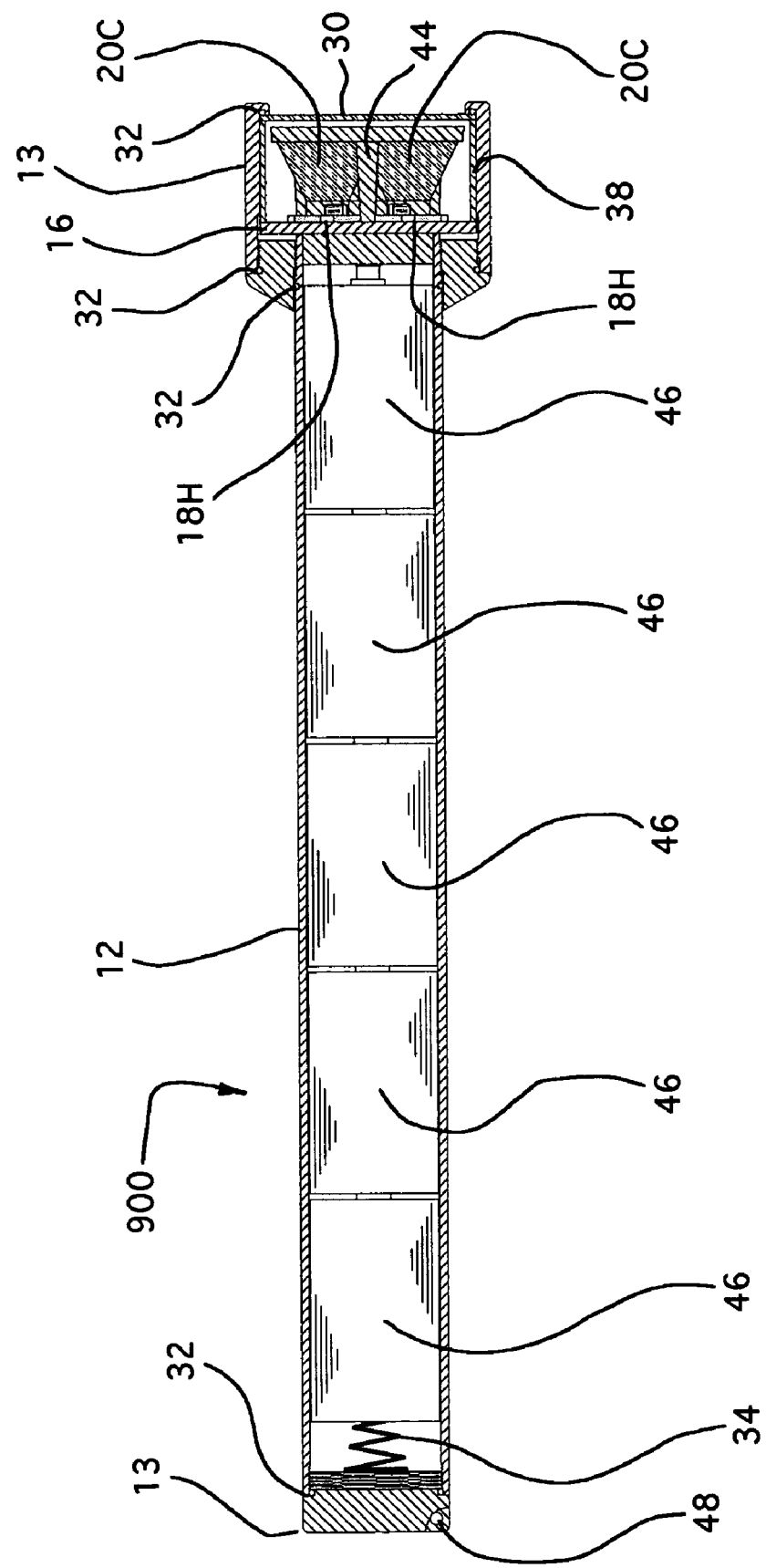
FIG. 12 is a sectional side view of a light source according to another embodiment of the present invention.

FIG. 12 illustrates a 5D cell sized fixed tri-lens flashlight 900 according to the present invention. The flashlight 900 is similar to the flashlight 500 with the end cap 13 thereof replaced with the end cap of flashlight 700 or 800 discussed above. In other words the flashlight 500 can be converted to the flashlight 900 with replacement of the appropriate end cap 13.

Figure 13:
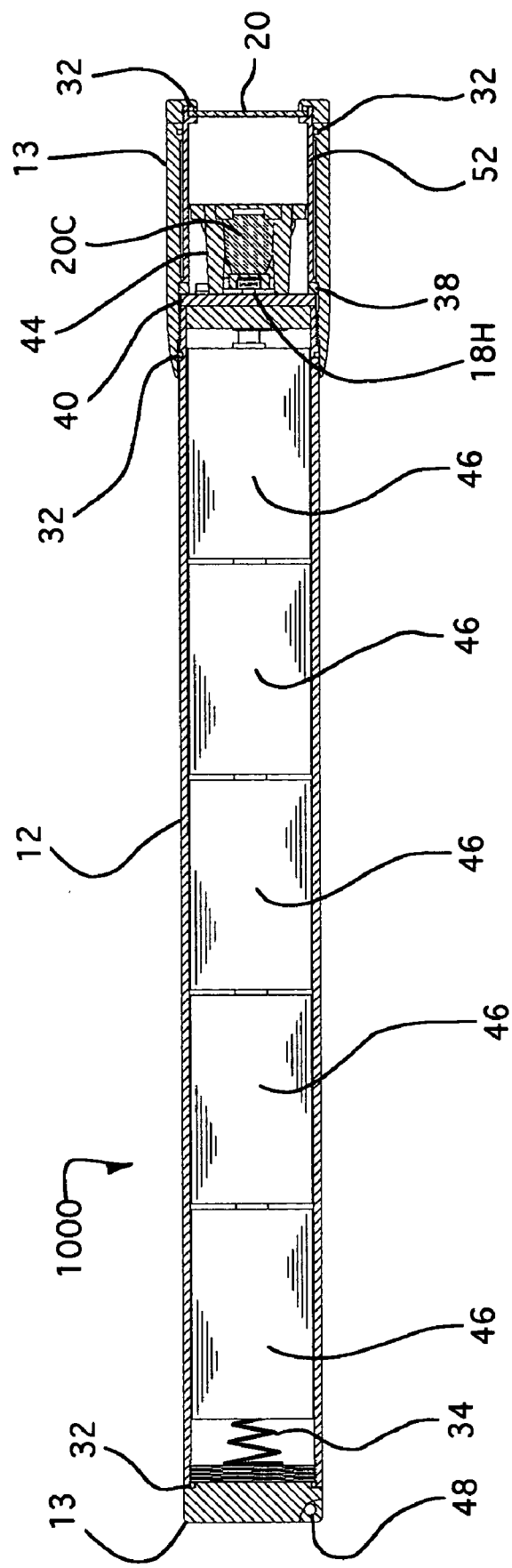
FIG. 13 is a sectional side view of a light source according to another embodiment of the present invention.

FIG. 13 illustrates a 5D cell sized zoom lens flashlight 1000 according to the present invention. The flashlight 1000 is similar to the flashlights 500 and 900 with the respective end cap 13 thereof replaced with an end cap 13 having a manually moveable slide mount 52 for adjusting the position of an optic 20 relative to the optic 20C on the LED element 18H. This end cap 13 with the slide mount 52 provides a zoom lens, light focusing mechanism for the operator. The zoom available end cap 13 can be used on the 3D cell and the 3AA sized flashlights discussed above. Again the changing between light source types involves removing and replacing end caps 13.

Figure 14:
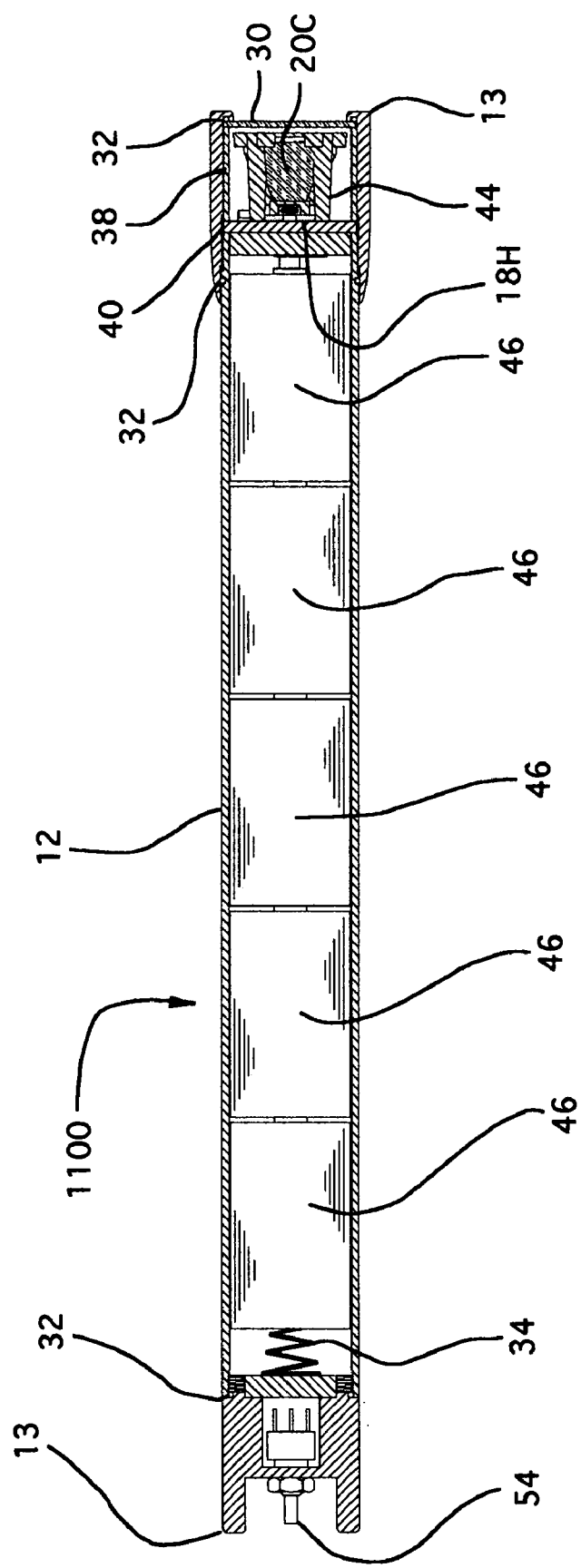
FIG. 14 is a sectional side view of a light source according to another embodiment of the present invention.

FIG. 14 illustrates a 5D cell sized fixed lens flashlight 1100 according to the present invention. The flashlight 1100 is similar to the flashlight 500 with the rear end cap 13 having a push button mechanism 54 for activating the flashlight 1100. The electrical connection for activation of the flashlight 1100 does not require the further tightening of the front end cap 13, but can be incorporated into the pushbutton mechanism 54. Of course, with the push button 54 in the on position, tightening or loosening of the end caps will also turn the flashlight 1100 on and off as will be understood to those of ordinary skill in the art. The push button rear end cap 13 can be used on the 3D cell and the 3AA sized flashlights discussed above. Again the changing between light source types generally involves removing and replacing end caps 13 (and associated elements).

Figure 15:
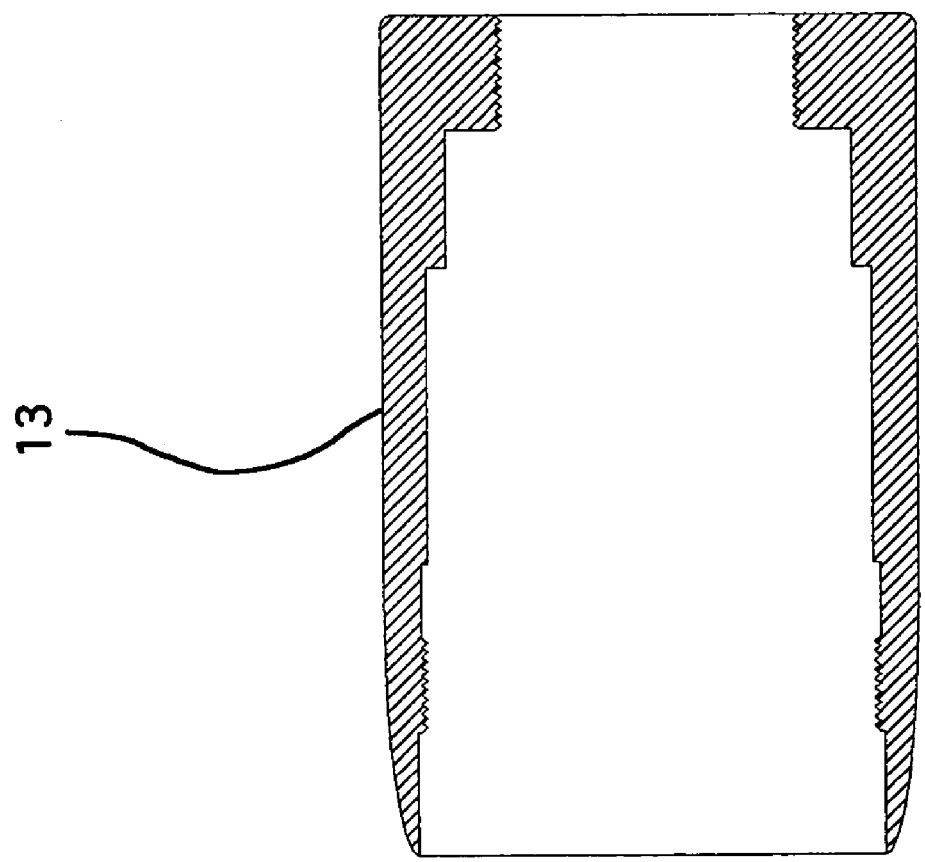
FIG. 15 is a sectional side view of a fiber optic coupling end cap for a light source according to the various embodiments of the present invention.

FIG. 15 illustrates an end cap 13 for the flashlight light sources discussed above that includes a fiber optic bundle coupling adapter at the one end thereof. The end cap 13 of FIG. 15 can be used with the flashlights discussed above to provide a portable fiber optic light source. For example, this end cap 13, or adaptor, essentially allows the flashlights above to serve as portable boroscope light source.

Figure 16B:
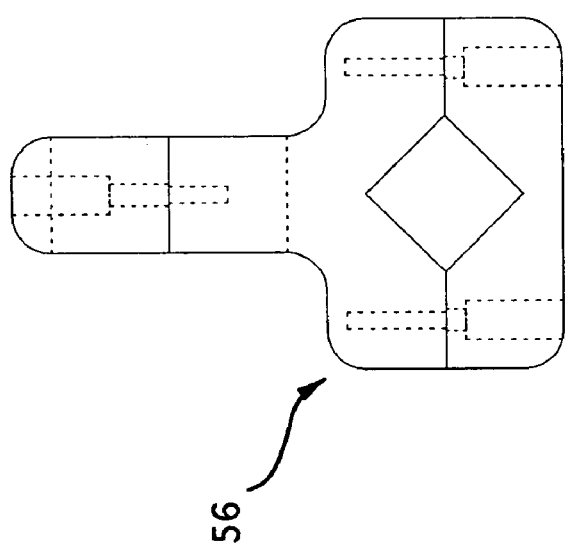
FIGS. 16A, 16B and 16C are front, side and bottom views of a coupling clamp for a light source according to the various embodiments of the present invention.
Figure 16A:
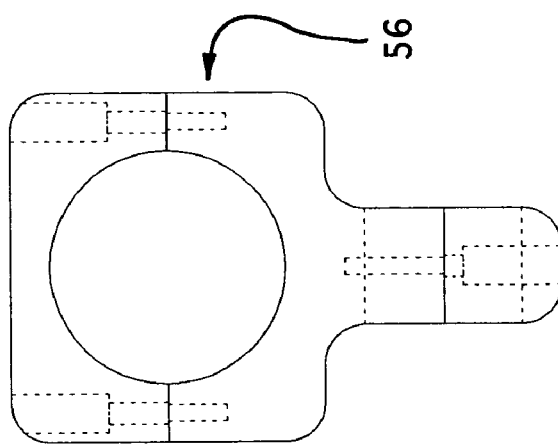
Figure 16C:
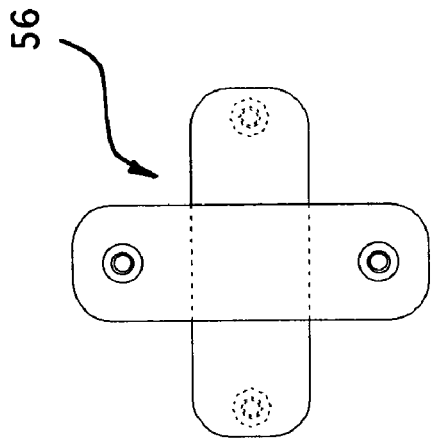

FIGS. 16A–C illustrates a clamp 56 for attachment of the cylindrical housing 12 of the light sources described above. The clamp 56 has a portion clamped around the housing 12 and a separate attachment element for securing the structure to a base. The base may be a bicycle handle bar, or the leg of an assembly line conveyor. The clamp 56 may take many known shapes and is representative of a wide variety of attachment or securing systems that can be used. For example, the cylindrical housing 12 allows a hose clamp design to be used in certain applications.

Figure 17:
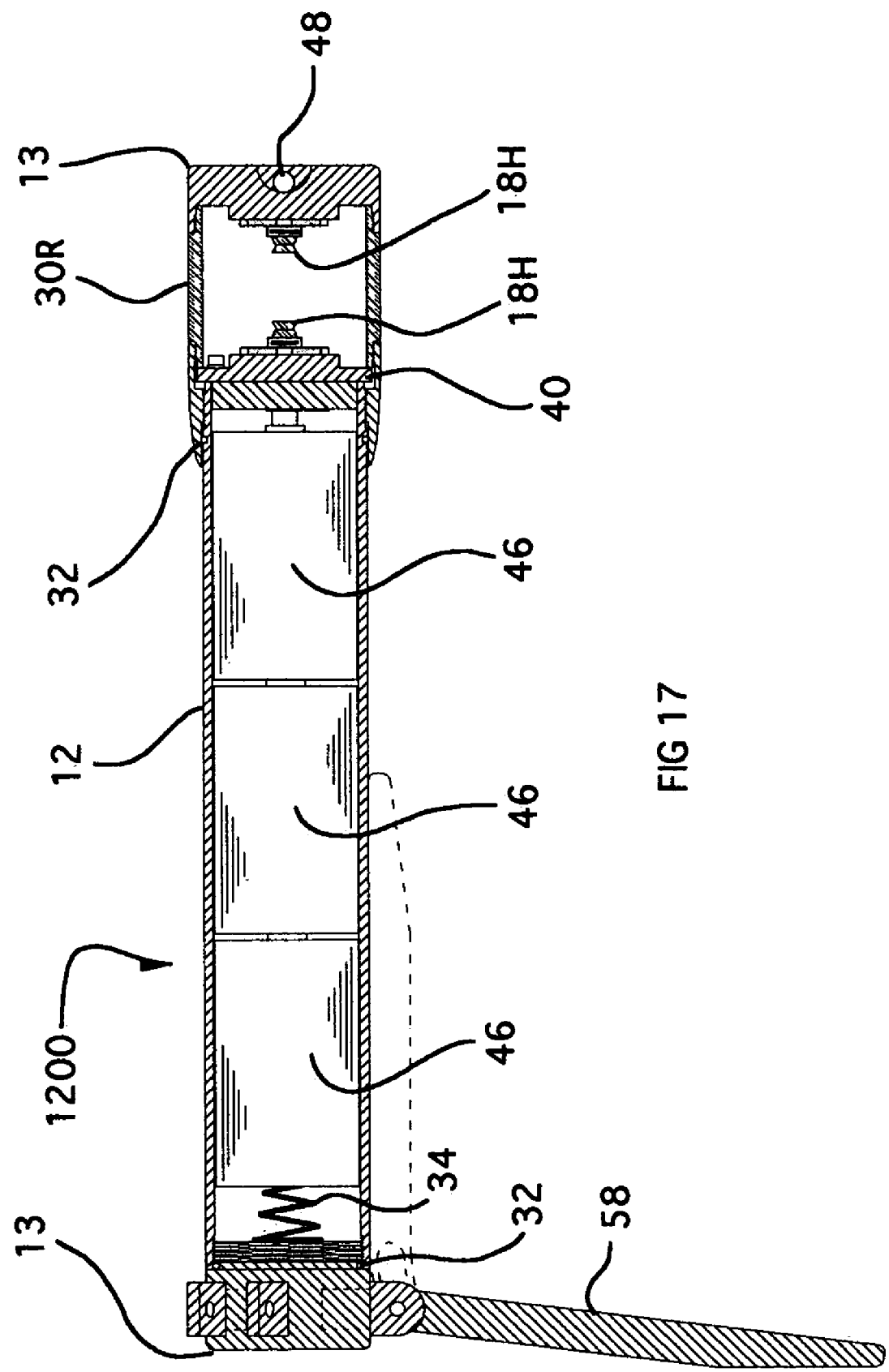
FIG. 17 is a sectional side view of a light source according to another embodiment of the present invention.

FIG. 17 illustrates a 3D cell sized lantern 1200 according to the present invention. The lantern 1200 is similar to the flashlight 400 in that the same housing 12 is used. The rear end cap 13 has three pivoting, locking legs 58 to support the lantern 1200 when the legs are deployed. The legs 58 are pivoted about a pin connection on the end cap 13 from a stored position, shown in phantom, adjacent the housing. When each leg 58 has reached a deployed position, which is generally perpendicular to the housing 12, the rearward end of the leg 58 can be pushed into a receiving hole (shown in phantom) in the end cap 13 to lock the leg 58 in the deployed position. The leg 58 has a slot receiving the pin of the end cap 13 to allow for the pivoting then rectilinear motion. Only one leg 58 is shown in the figure, but the remaining two are identical and are evenly spaced about the end cap 13. The end cap 13 could have more than three legs 56, but three is believed to be the minimum needed to form a stable base for the lantern 1200 when the legs 58 are deployed.

The lighting end of the lantern 1200 of FIG. 17 includes an end cap 13 with a pair of opposed elements 18H with the light being emitted through a radial or tubular window 30R. The term "lantern" within the meaning of the present invention is radial light emission for illumination. The "lantern" will be a sub set of the "flashlights" of this application which can be axial light emission or radial light emission or right angle light emissions. The window may be clear or may include a diffuser as desired for the lantern effect. The end cap 13 at the front end of the lantern 1200 includes support 48 to allow the lantern to be hung in a desired location. As with the above lights sources, the lantern 1200 can be formed through essentially replacement of the end caps 13 from earlier embodiments.

Figure 18:
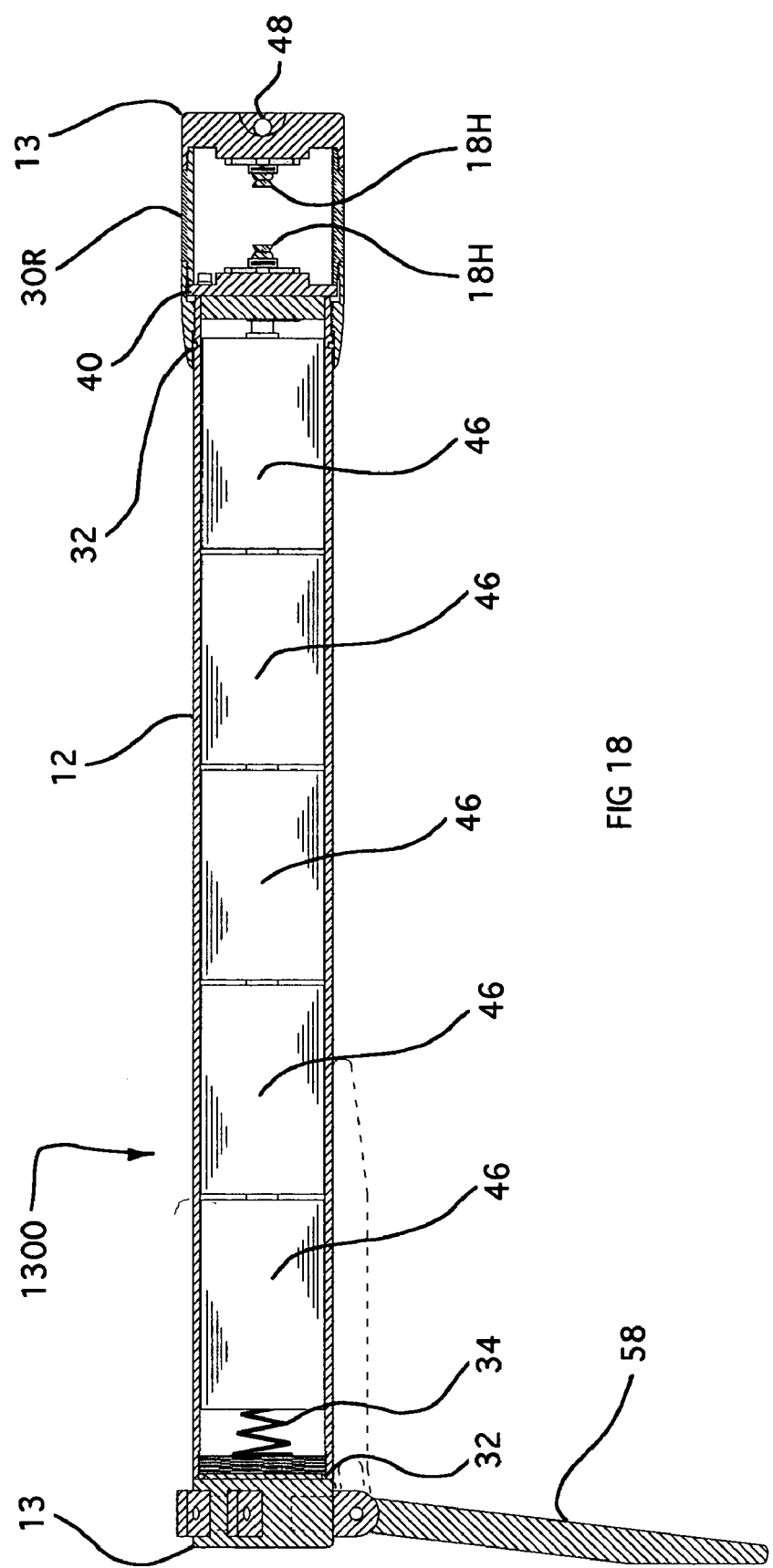
FIG. 18 is a sectional side view of a light source according to another embodiment of the present invention.

FIG. 18 illustrates a 5D cell sized lantern 1300 according to the present invention. The lantern 1300 is similar to the lantern 1200 discussed above in connection with FIG. 17, except that the housing 12 is sized to receive 5 D-cell batteries 46. The lantern 1300 can be formed from a 5 D-cell flashlight described above through merely replacing of the end caps 13. It should also be apparent that the lantern 1300 can be formed from the lantern 1200 discussed above by merely replacing of the 3 D-cell length housing 12 with a 5 D-cell length housing 12. The modularity of the present invention is intended to provide either or both the end user and the manufacturer with great advantages. The end user may be provided with a number of distinct lighting sources with merely a few end caps 13. The manufacturer can manufacture a number of distinct products using a consistent base of materials or elements.

Figure 19:
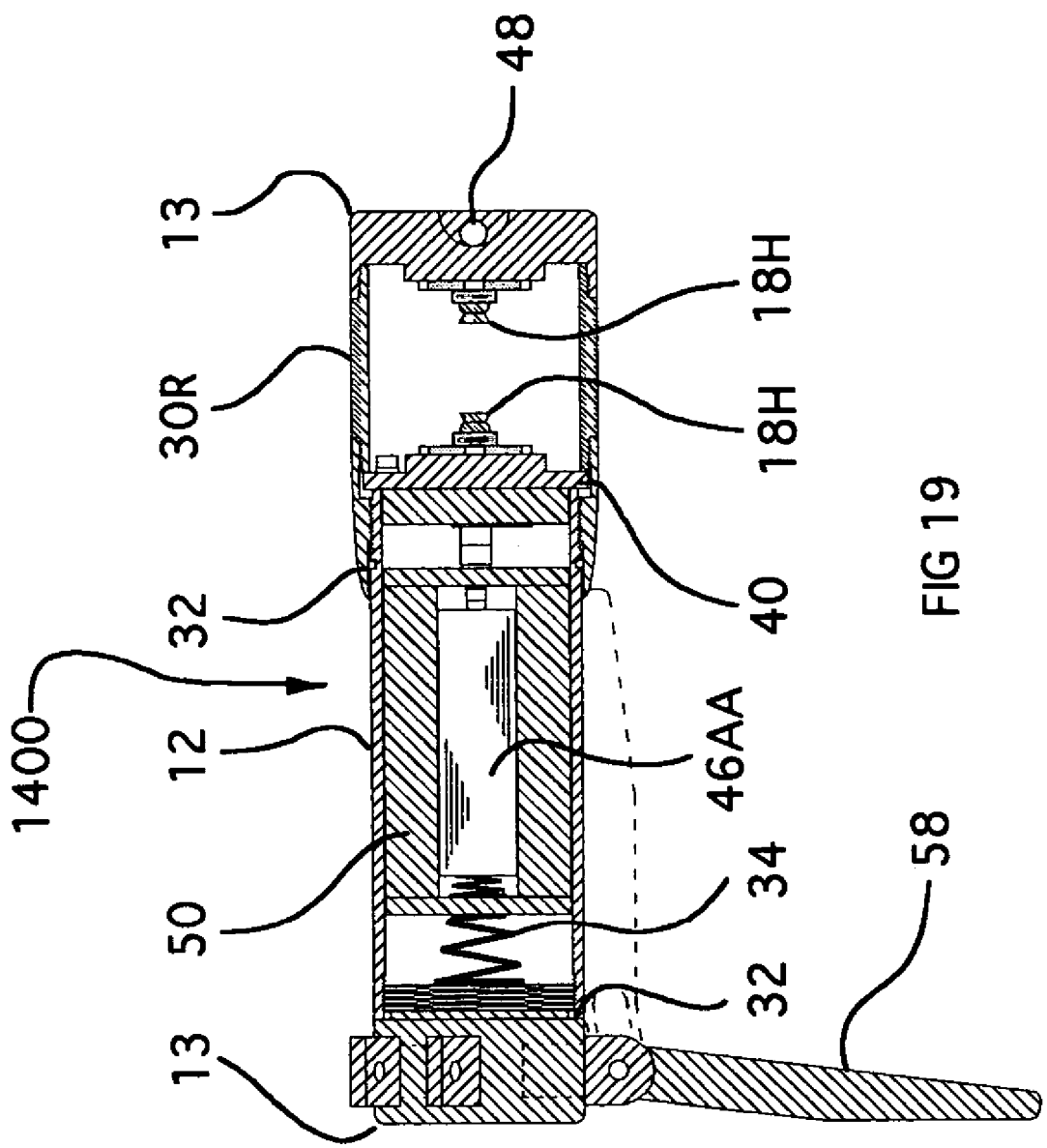
FIG. 19 is a sectional side view of a light source according to another embodiment of the present invention.

FIG. 19 illustrates a 3AA cell sized lantern 1400 according to the present invention. The lantern 1400 is similar to the lanterns 1200 and 1300 discussed above in connection with FIGS. 17 and 18, except that the housing 12 is sized to receive the battery pack mount 50 and the associated batteries 46AA.

Figure 20:
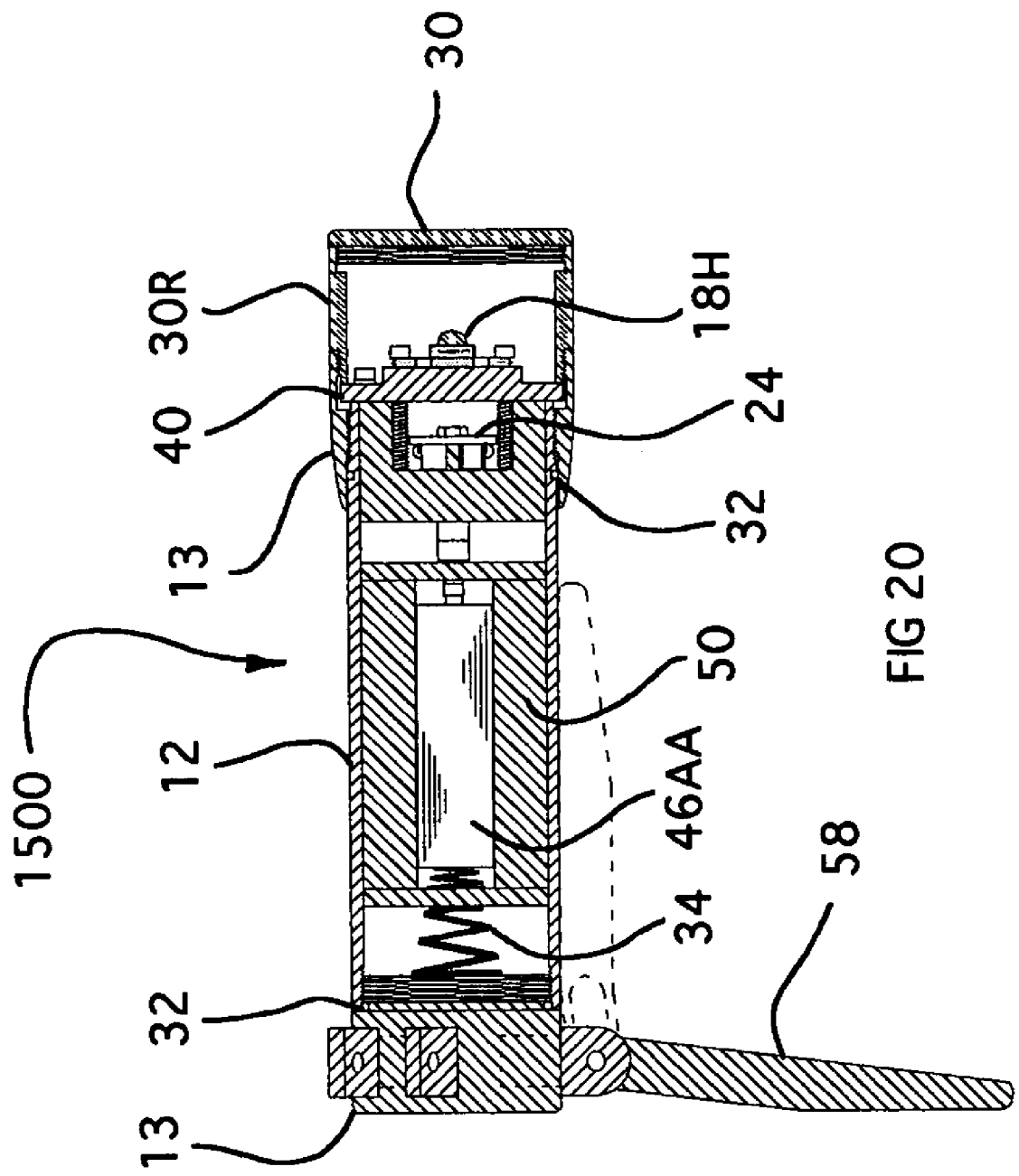
FIG. 20 is a sectional side view of a signalling device according to another embodiment of the present invention.

FIG. 20 illustrates a 2AA cell sized search-rescue strobe 1500 according to the present invention. The strobe 1500 is similar to the lantern 1400 discussed above in connection with FIG. 19. The purpose of this device is to signal, as opposed to illuminate as with the other light sources of the present invention. The signalling function allows the LED element 18H to be a red or yellow LED element. This wavelength LED can be operated with 2 AA sized batteries 46AA. Consequently the battery pack 50 can be designed to hold only 2 batteries 46AA, or the same battery pack 50 with three batteries slots could be used with one slot holding a connecting rod the same length as a battery 46AA. A controller 24 may provide intermitted flashing of the LED element 18, the provision of which can be accommodated through a slight increase in the length of the housing 12 (however it is also contemplated that the battery biasing spring could be used to accommodate the space for the controller through further compression thereof). The end cap 13 further would include a radial window 30R and an axial window 30 for complete signalling possibilities. The modular aspects of the present invention should still be apparent. A user can quickly convert from the lantern 1400 to the search-rescue strobe 1500 by (1) unscrewing the front end cap 13 and removing the mounting plate 40 and the battery pack 50, (2) inserting a connecting rod in place of one battery 46AA and re-inserting the battery pack 50 together with the controller 24 and element 18H of the search-rescue strobe 1500, and (3) threading on the end cap 13 of the search-rescue strobe 1500. The entire conversion would take less than half of one minute.

Figure 21:
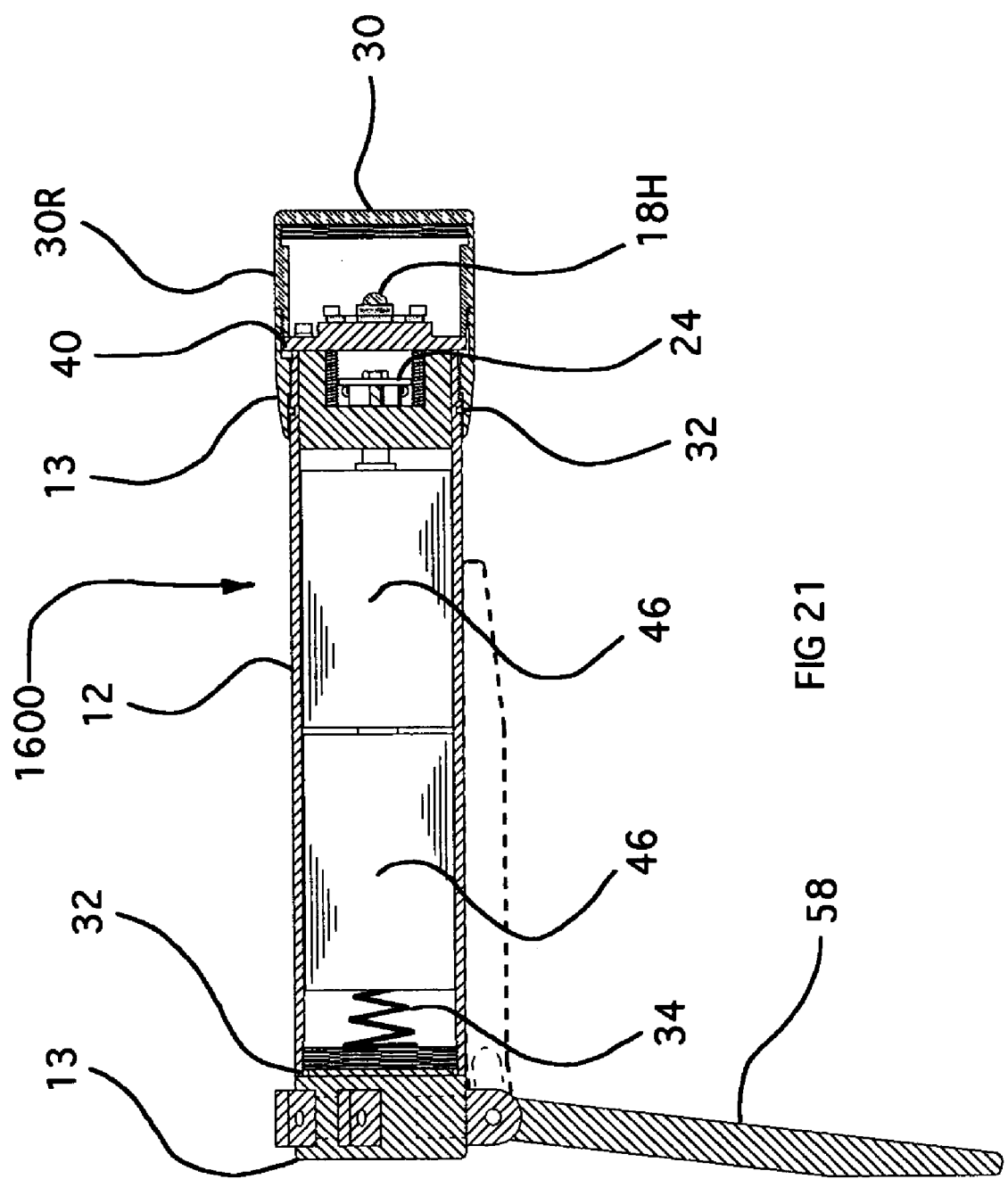
FIG. 21 is a sectional side view of a signalling device according to another embodiment of the present invention.

FIG. 21 illustrates a 2 D-cell sized search and rescue strobe 1600. The search and rescue strobe 1600 is similar to the search and rescue strobe 1500 discussed above in connection with FIG. 20, except that the housing 12 is sized for two D-cell batteries 46. The two D-cell batteries are sufficient power source for a red or red-orange LED element 18H that would typically be used for signalling.

Figure 22:
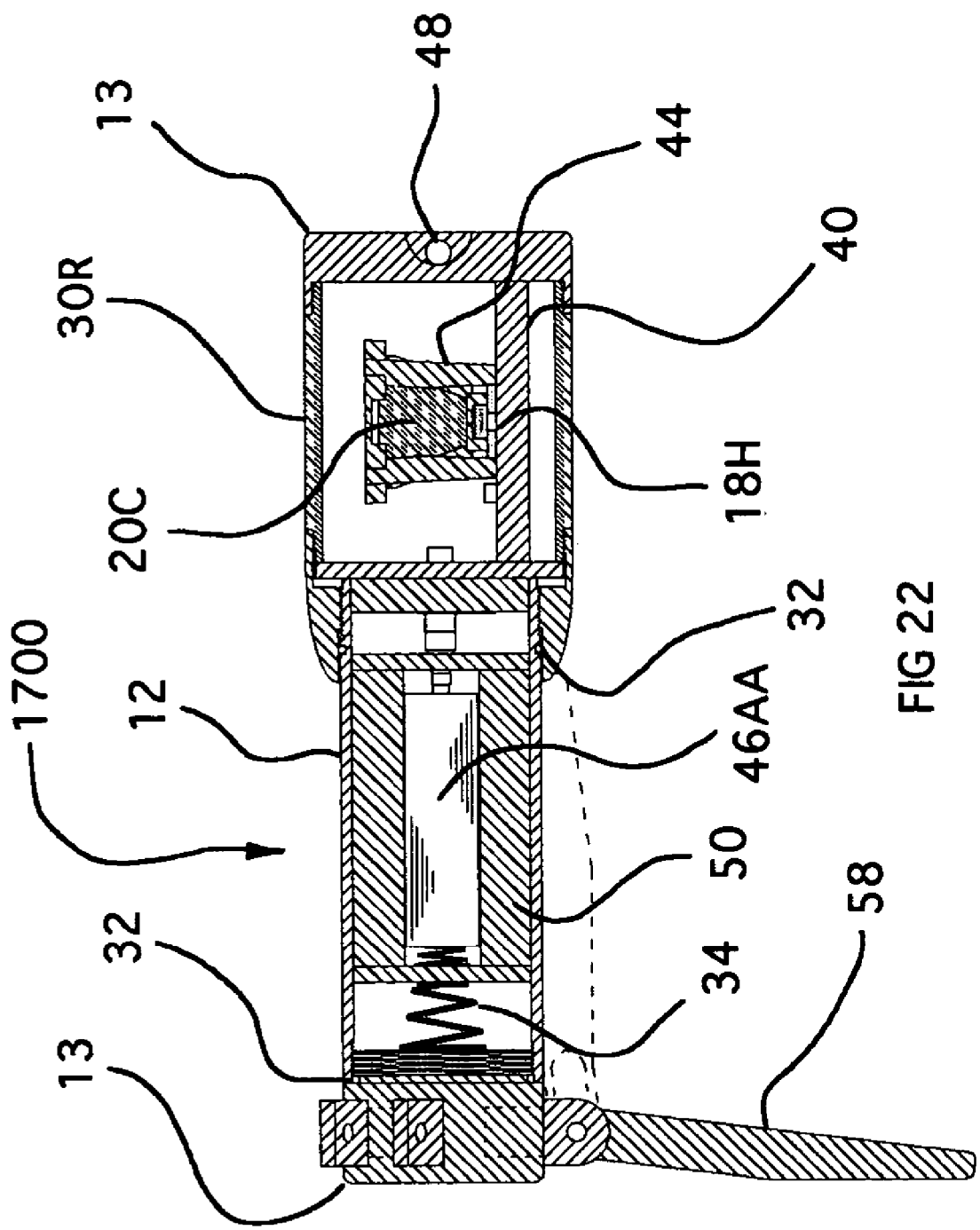
FIG. 22 is a sectional side view of a light source according to another embodiment of the present invention.

FIG. 22 illustrates a 3AA cell sized trouble light 1700 according to the present invention. The term "trouble light" within the meaning of the present invention is right angle light emission for illumination. The light is directed in a given direction perpendicular to the axis of the housing 12, as opposed to a complete 360 degree radial dispersion as found in the lanterns. The "trouble lights" will be a sub-set of the "flashlights" of this application. Again the "flashlights" can be axial light emission or radial light emission or right angle light emissions. The trouble light 1700 is similar to the 3AA cell sized lantern 1400 discussed above in connection with FIG. 19. The main difference is in the mounting of the LED element 18H on a mounting plate 40 at a position generally perpendicular to the axis of the housing 12. An optic 20C and a mount are also provided for this "right angle" light. The rear end cap 13 with legs 58 allows the trouble light to be easily independently supported for directing the light onto a working surface, such as under a sink, or within a car wheel. The support 48 also allows the trouble light to be placed in a hanging location where desired, such as hanging from a car hood.

Figure 23:
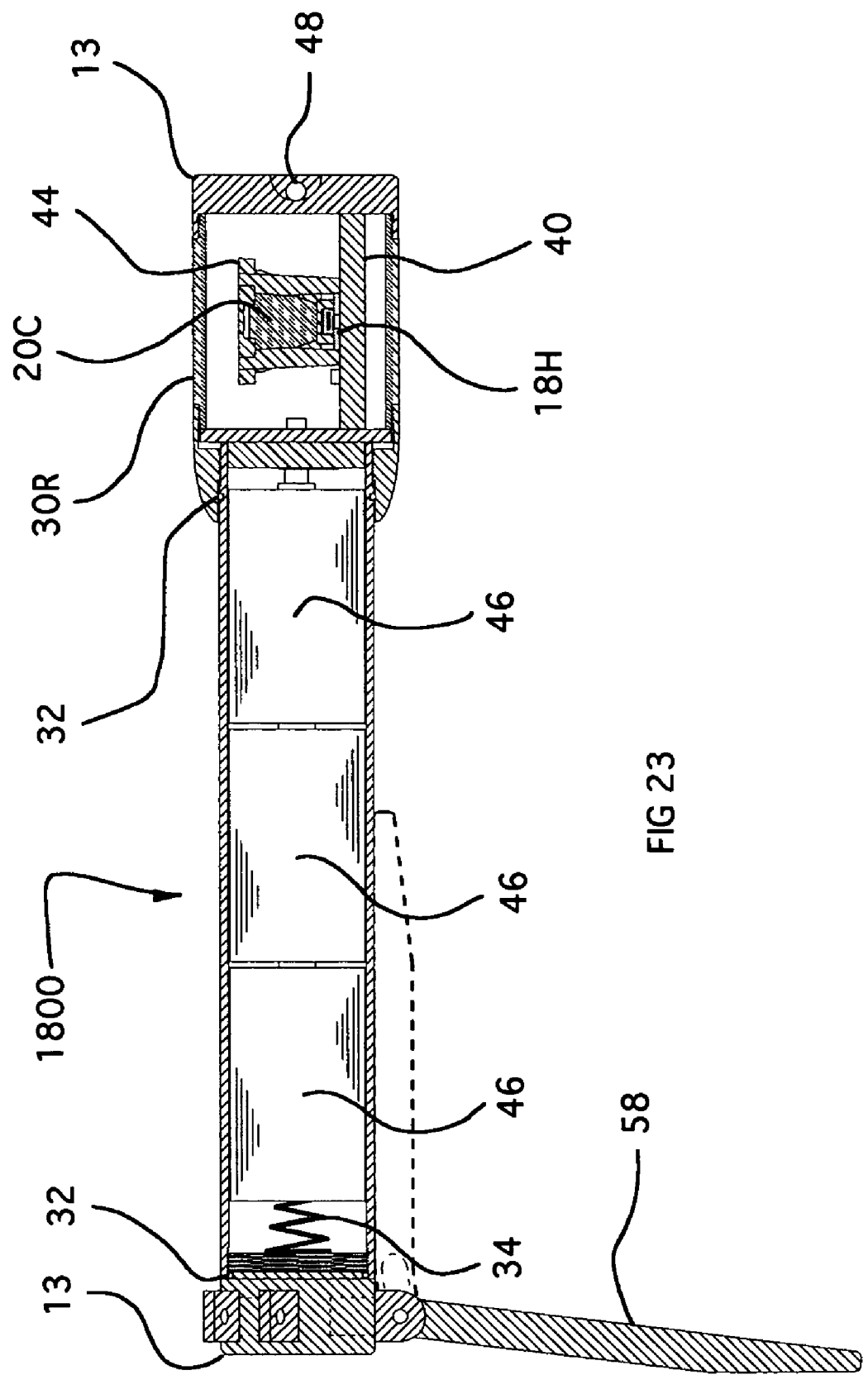
FIG. 23 is a sectional side view of a light source according to another embodiment of the present invention.

FIG. 23 illustrates a 3 D-cell sized trouble light 1800 according to the present invention. The trouble light 1800, also called a utility light, is similar to the trouble light 1700 discussed above in connection with FIG. 22, except that the housing 12 is sized to receive the 3 D-cell batteries 46, in the same manner as the other 3 D-cell lighting sources discussed above.

Figure 24:
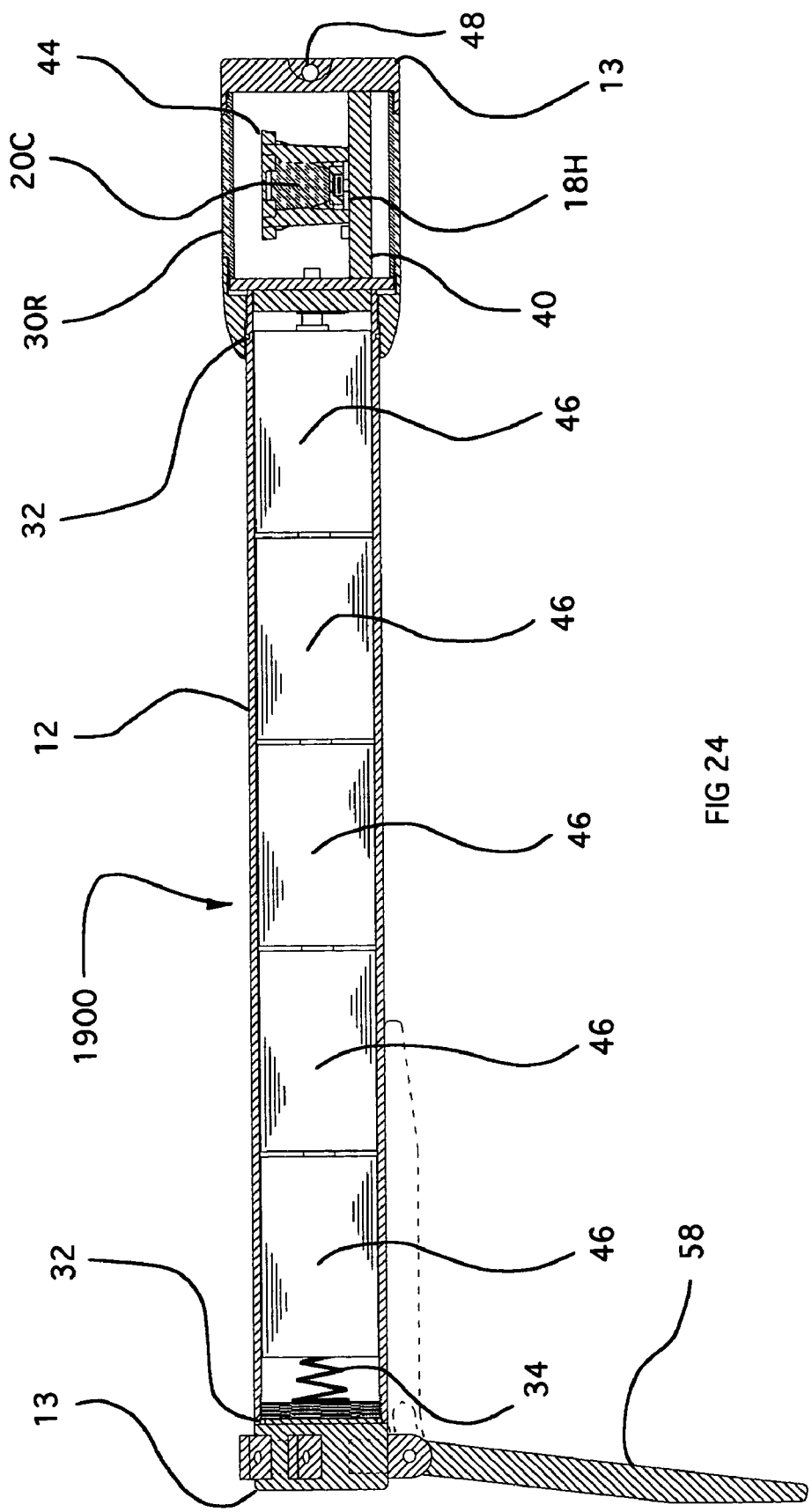
FIG. 24 is a sectional side view of a light source according to another embodiment of the present invention.

FIG. 24 illustrates a 5 D-cell sized trouble light 1900 according to the present invention. The trouble light 1900 is similar to the trouble lights 1700 and 1800 discussed above in connection with FIGS. 22 and 23, except that the housing 12 is sized to receive the 5 D-cell batteries 46, in the same manner as the other 5 D-cell lighting sources discussed above. The length of the housing of the trouble light 1900, due to the five batteries 46, may make an advantageous self standing trouble or utility light.

Figure 25:
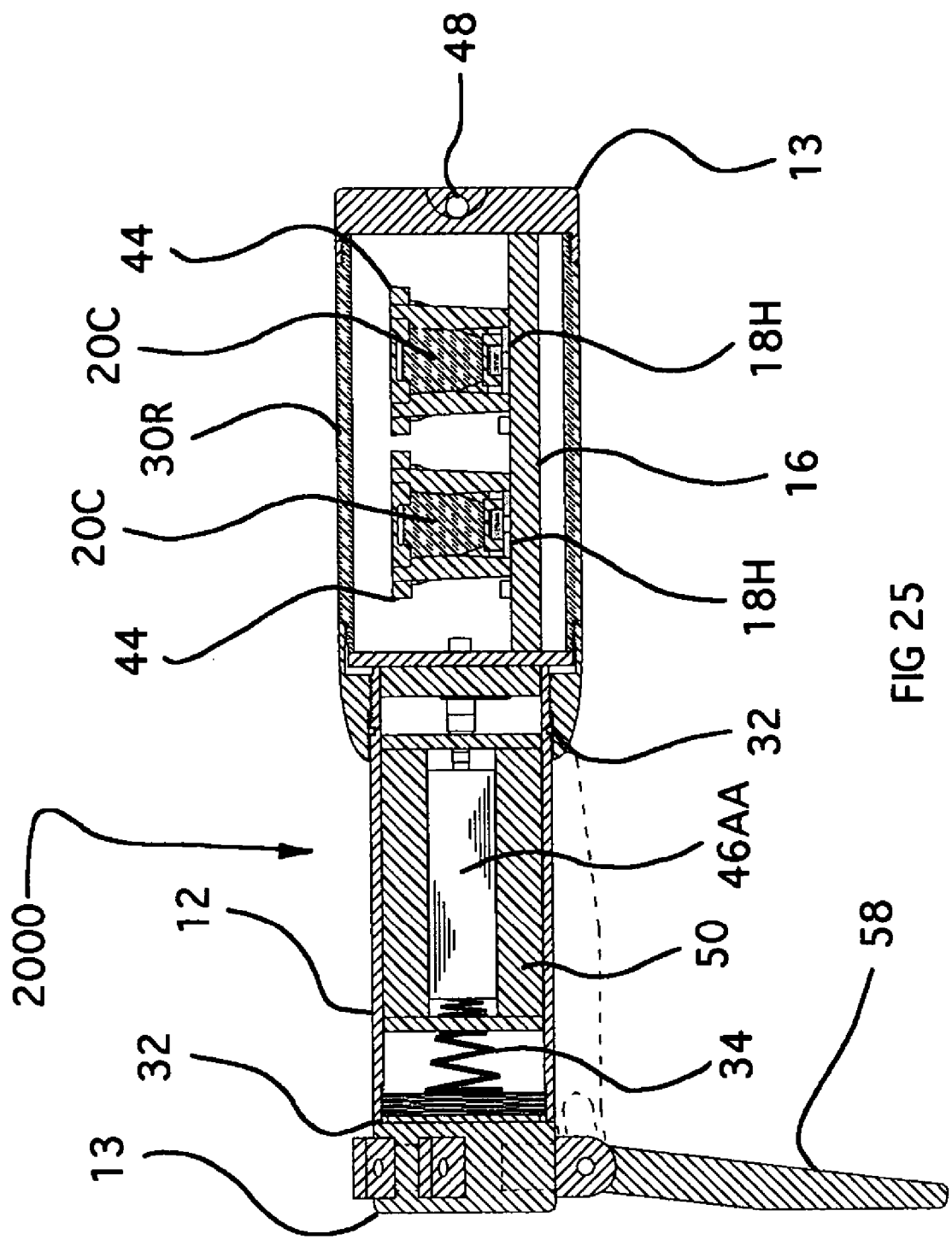
FIG. 25 is a sectional side view of a light source according to another embodiment of the present invention.

FIG. 25 illustrates a 3 AA-cell sized trouble light 2000 according to the present invention. The trouble light 2000 is similar to the trouble light 1700 discussed above in connection with FIG. 22, except that the front end cap 13 has a pair of LED elements 18H each with optics 20C and mounts 44 attached to the support plate 40. The window 30R is increased in length accordingly.

Figure 26:
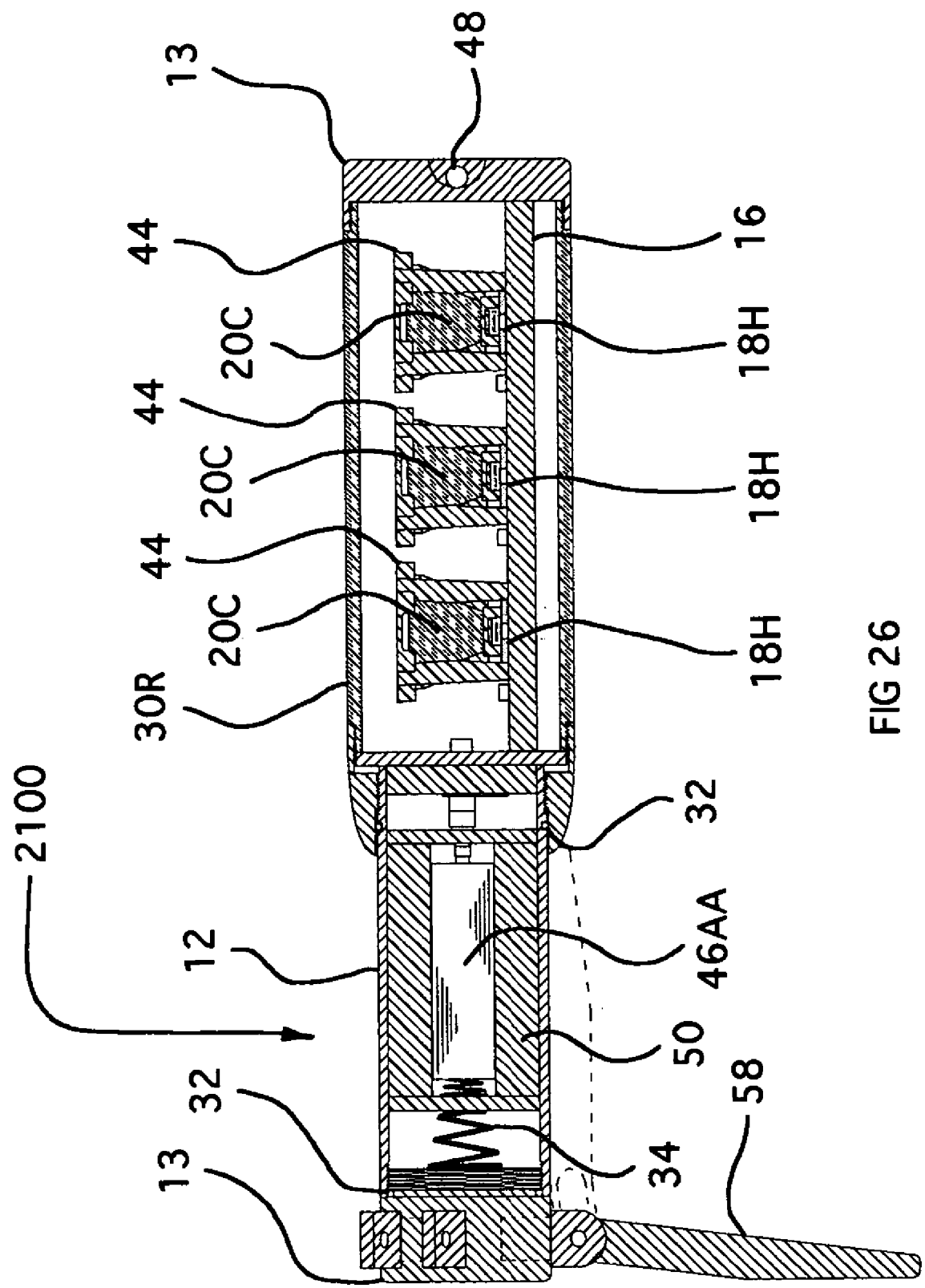
FIG. 26 is a sectional side view of a light source according to another embodiment of the present invention.

FIG. 26 illustrates a 3 AA-cell sized trouble light 2100 according to the present invention. The trouble light 2100 is similar to the trouble lights 1700 and 2000 discussed above in connection with FIG. 22 and FIG. 25, except that the front end cap 13 has three LED elements 18H each with optics 20C and mounts 44 attached to the support plate 40. The window 30R is increased in length accordingly.

Figure 27:
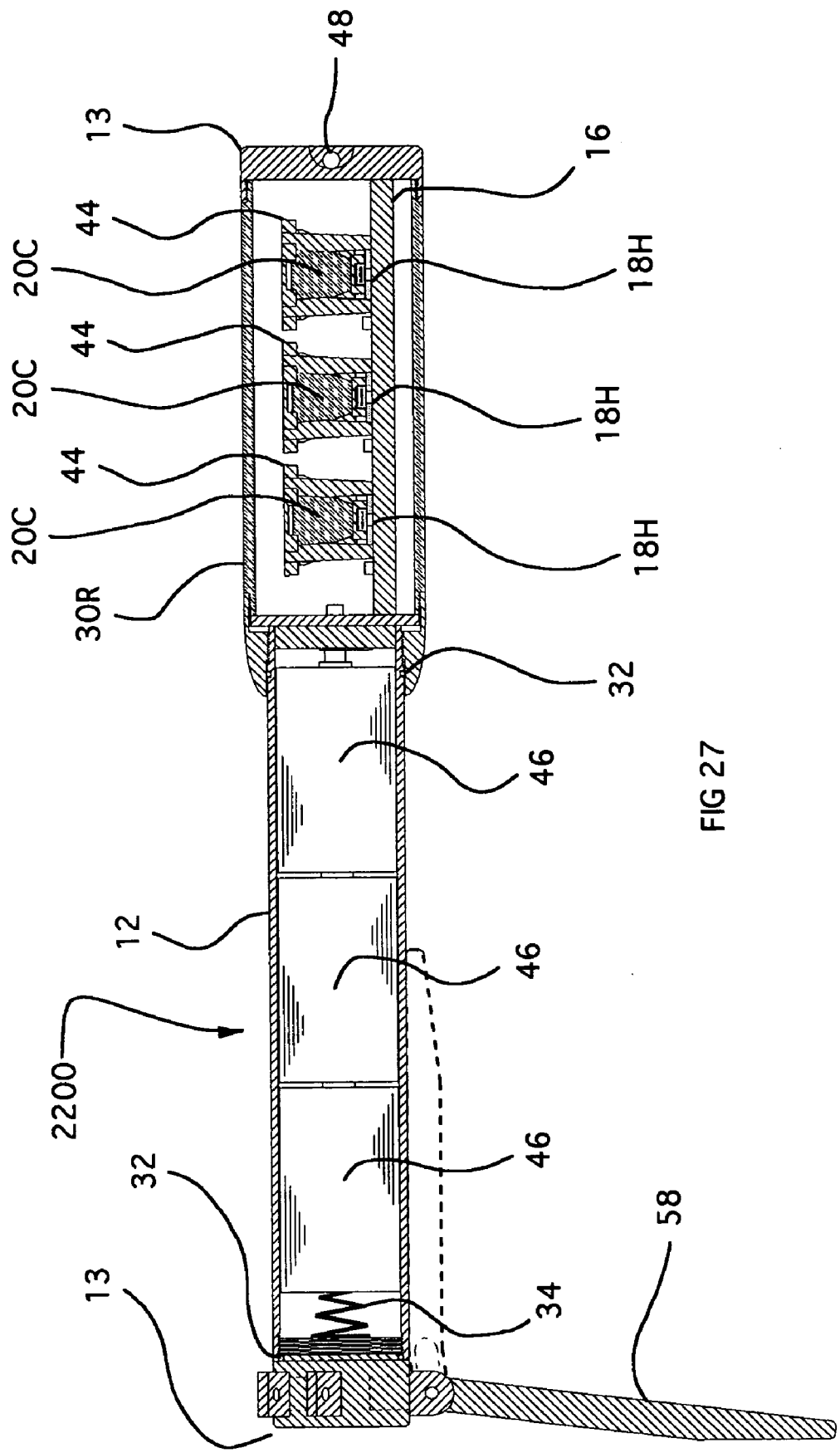
FIG. 27 is a sectional side view of a light source according to another embodiment of the present invention.

FIG. 27 illustrates a 3 D-cell sized trouble light 2200 according to the present invention. The trouble light 2200 is similar to the trouble light 2100 discussed above in connection with FIG. 26, except that the housing 12 is sized to receive the 3 D-cell batteries 46, in the same manner as the other 3 D-cell lighting sources discussed above. The two and three LED element 18H version of the trouble lights of the present invention are not limited to AA sized batteries as shown here.

Figure 28:
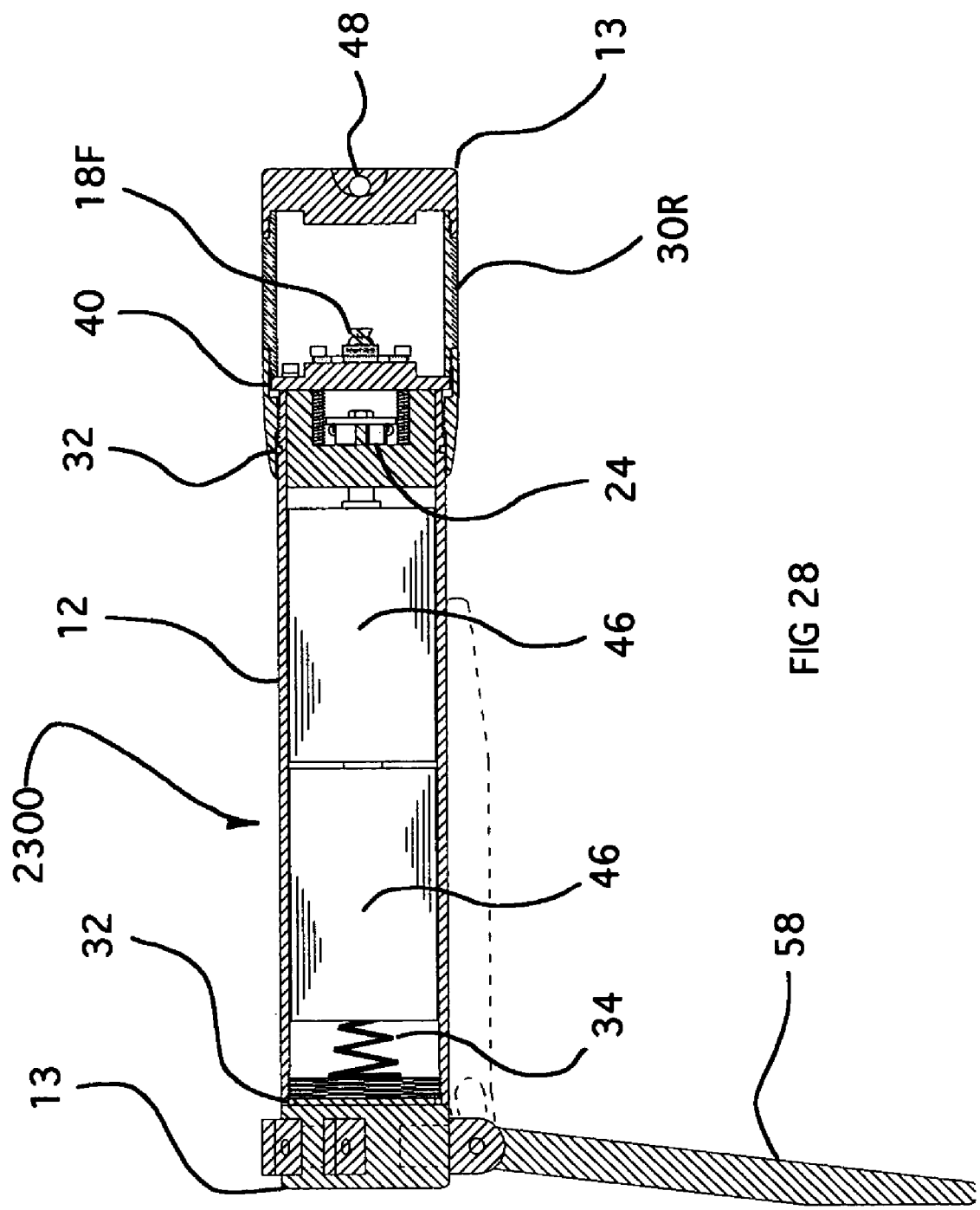
FIG. 28 is a sectional side view of a signalling device according to another embodiment of the present invention.

FIG. 28 illustrates a 2 D-cell sized flashing flare 2300 according to the present invention. The flashing flare 2300 is similar to the strobe 1600 discussed above in connection with FIG. 20. This is a signalling device, as opposed to illuminating device as with the other light sources of the present invention. The signalling function allows the LED element 18H to be a red or yellow LED element. This wavelength LED can be operated with 2 D-cell sized batteries 46, as opposed to three. A controller 24 may provide intermitted flashing of the LED element 18. The end cap 13 further would include a radial window 30R and a support 48 to allow for hanging up of the flashing flare 2300. The rear end cap 13 has legs 58 to provide a self supporting device. It should be apparent that the main difference between the flare 2300 and the strobe 1600 is the provision of only radial emission.

Figure 29:
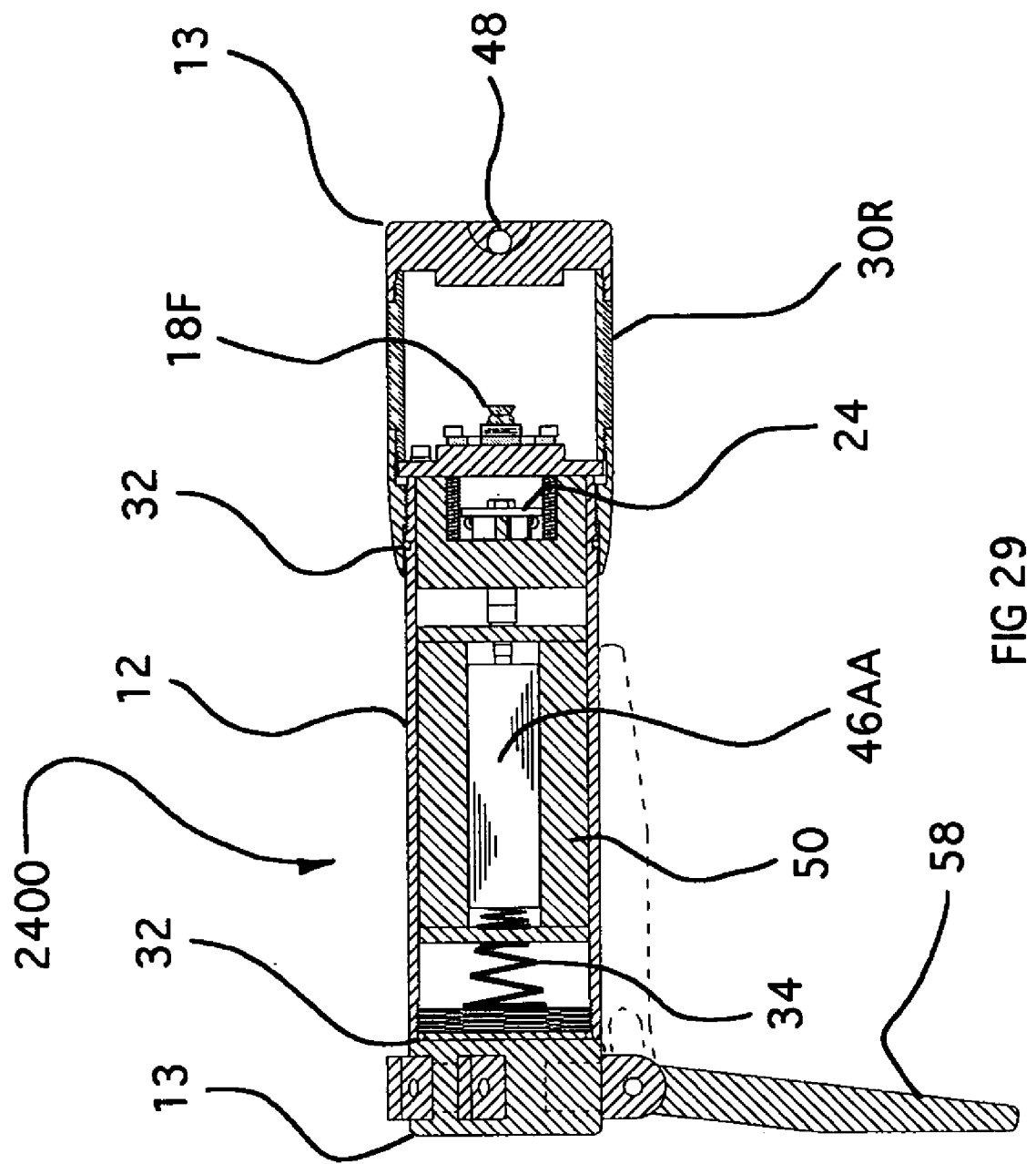
FIG. 29 is a sectional side view of a signalling device according to another embodiment of the present invention.

FIG. 29 illustrates a 2 AA-cell sized flashing flare 2400. The flare 2400 is similar to the search and rescue strobe 1500 discussed above in connection with FIG. 20, except that the front end cap 13 is the same as with the flare 2300 (radial emission through window 30R only). The two AA-cell batteries are sufficient power source for a red or red-orange LED element 18H that would typically be used for signalling.

Figure 30:
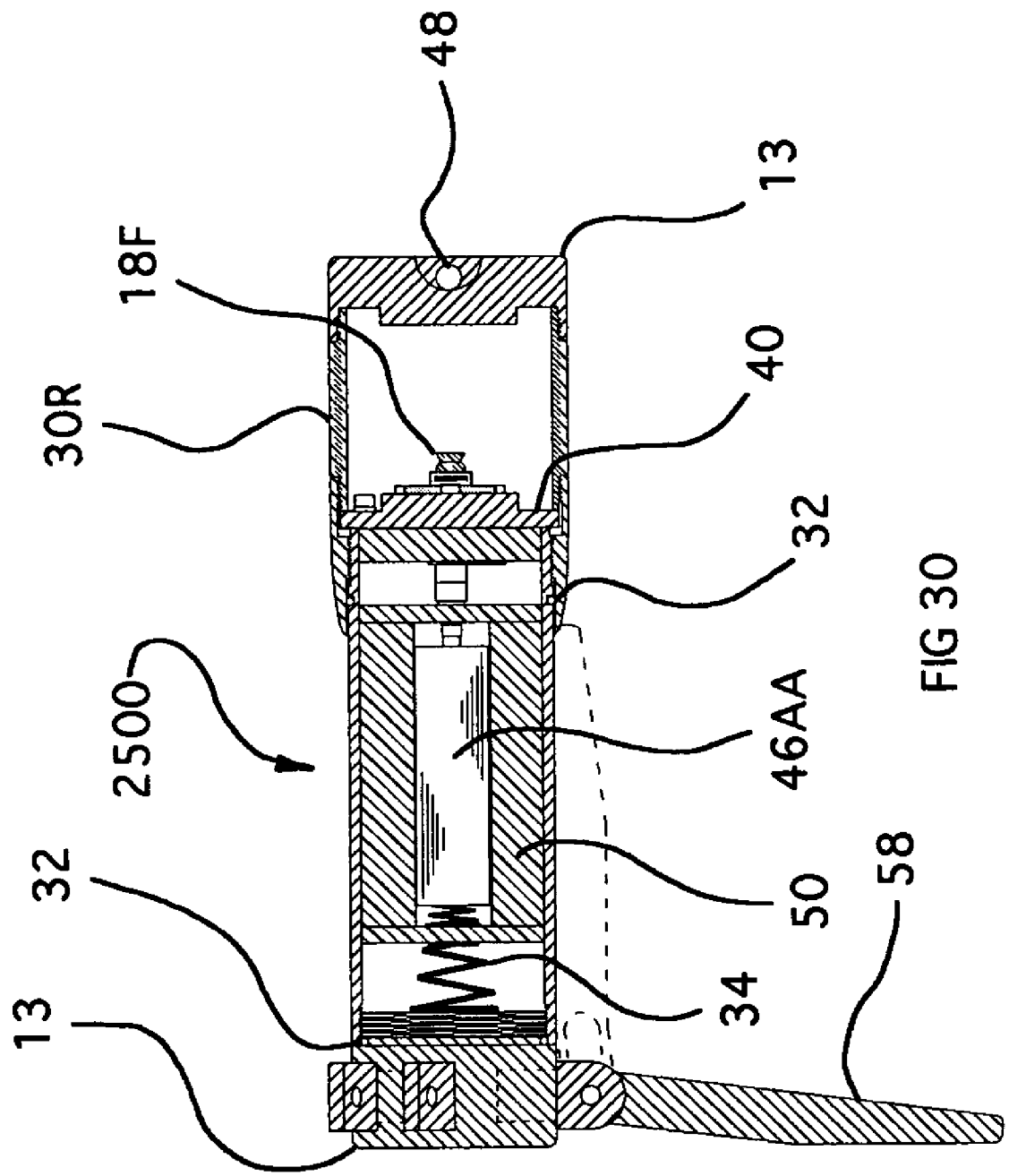
FIG. 30 is a sectional side view of a signalling device according to another embodiment of the present invention.

FIG. 30 illustrates a 2 AA-cell sized constant flare 2500. The flare 2500 is similar to the flashing flare 2400 discussed above in connection with FIG. 29, except that the controller 24 is omitted since the flare is not flashing. The two AA-cell batteries are sufficient power source for a red or red-orange LED element 18H that would typically be used for signalling.

Figure 31:
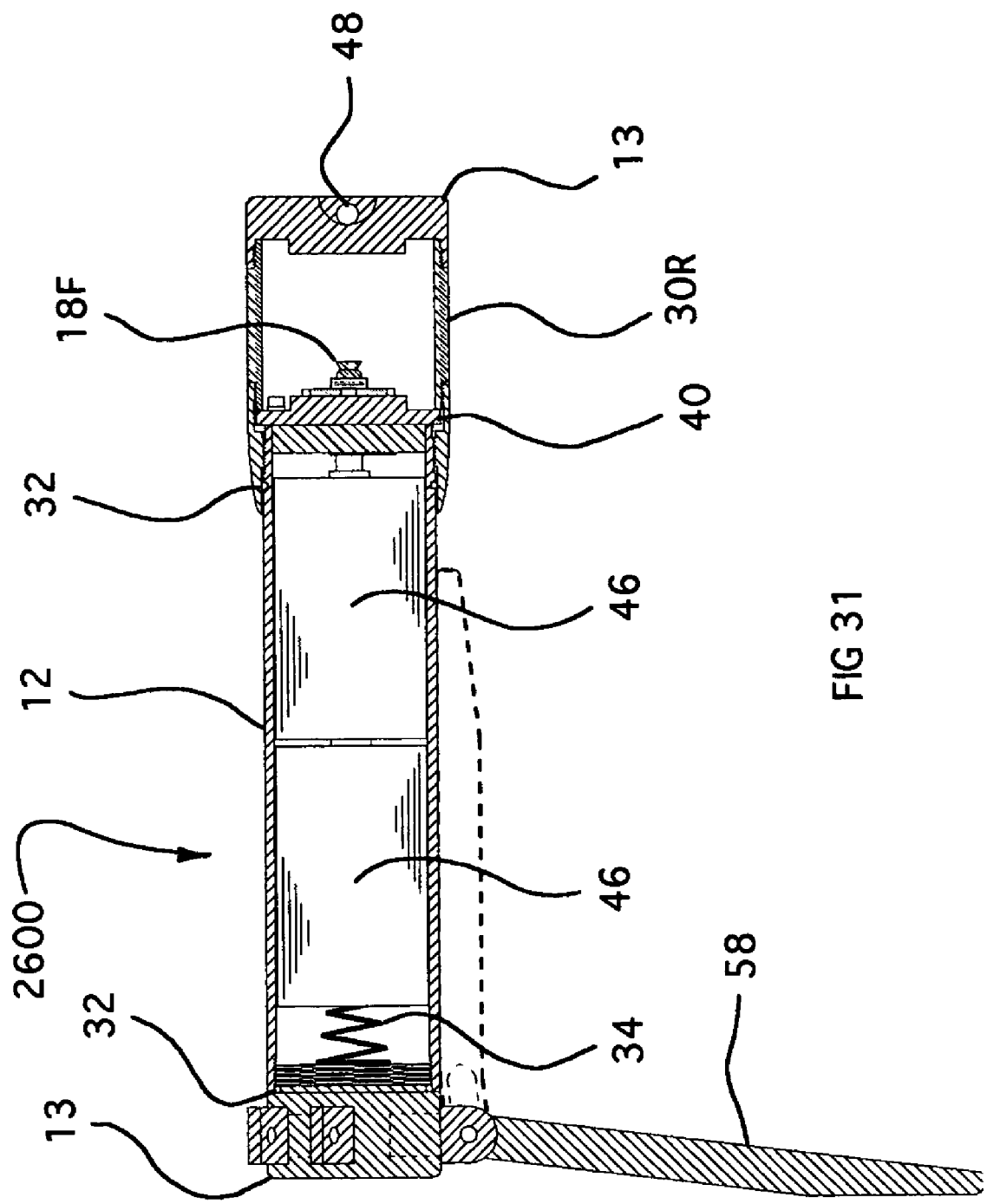
FIG. 31 is a sectional side view of a signalling device according to another embodiment of the present invention.

FIG. 31 illustrates a 2 D-cell sized constant flare 2600. The flare 2600 is similar to the flashing flare 2300 discussed above in connection with FIG. 28, except that the controller 24 is omitted since the flare is not flashing.

Figure 32:
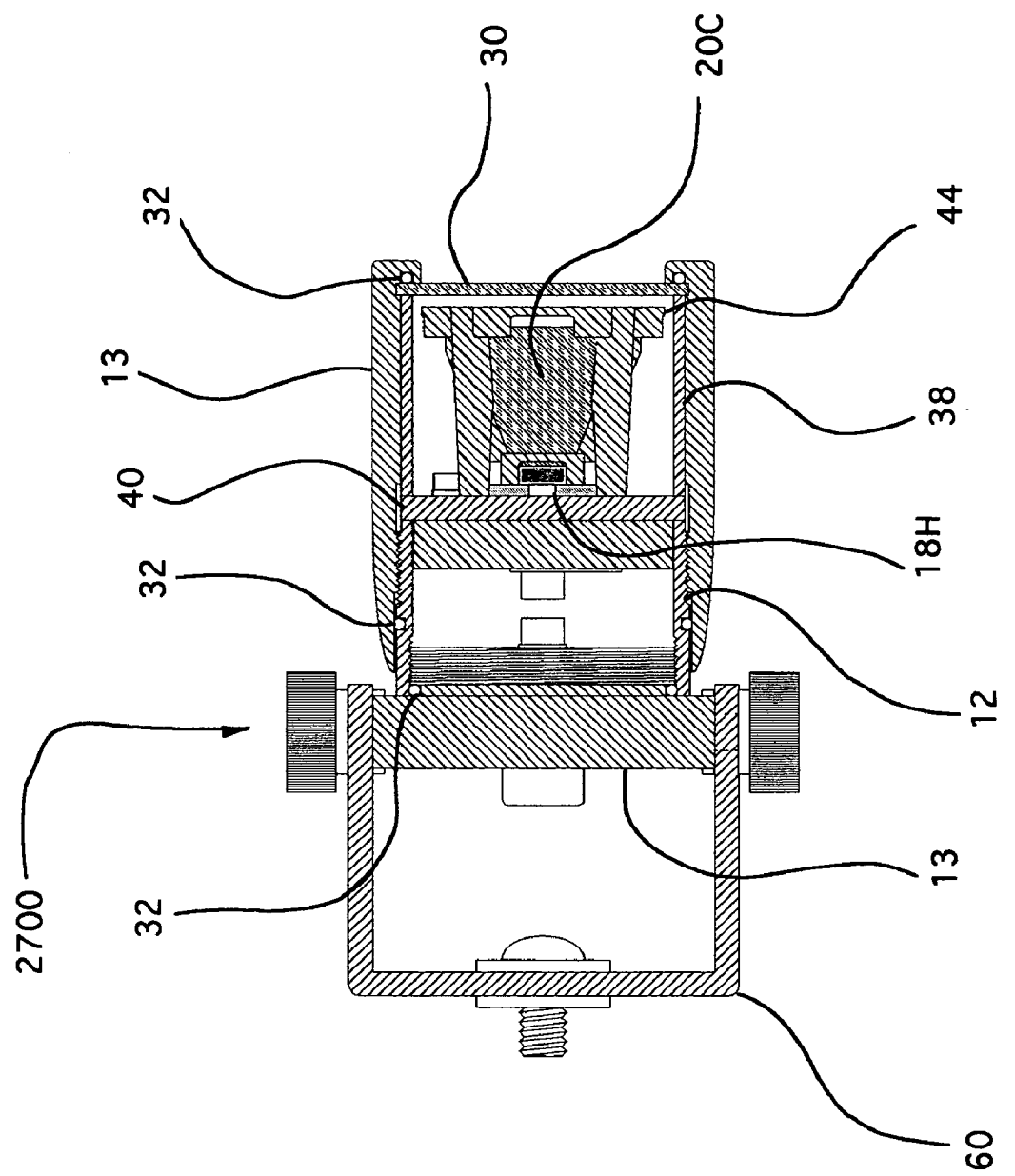
FIG. 32 is a sectional side view of a light source according to another embodiment of the present invention.

FIG. 32 illustrates a remote powered user mounted light source 2700. The light source 2700 uses the same modular concepts incorporated into the light sources discussed above including a pair of end caps 13 secured to opposite ends of a tubular housing 12. In the remote powered user mounted applications the power is supplied through an electrical cord extending through the rear end cap 13 and through the tubular housing 12. The front end cap 13 includes a mounting plate 40, LED element 18H, Optic 20C, optic mount 44, spacer 38 and window 30, similar to the flashlight light sources disclosed above. The rear end cap 13 includes an end cap base 60 pivotably mounted thereto. The base 60 can be attached to the user, such as to a miner's helmet or the like.

Figure 33:
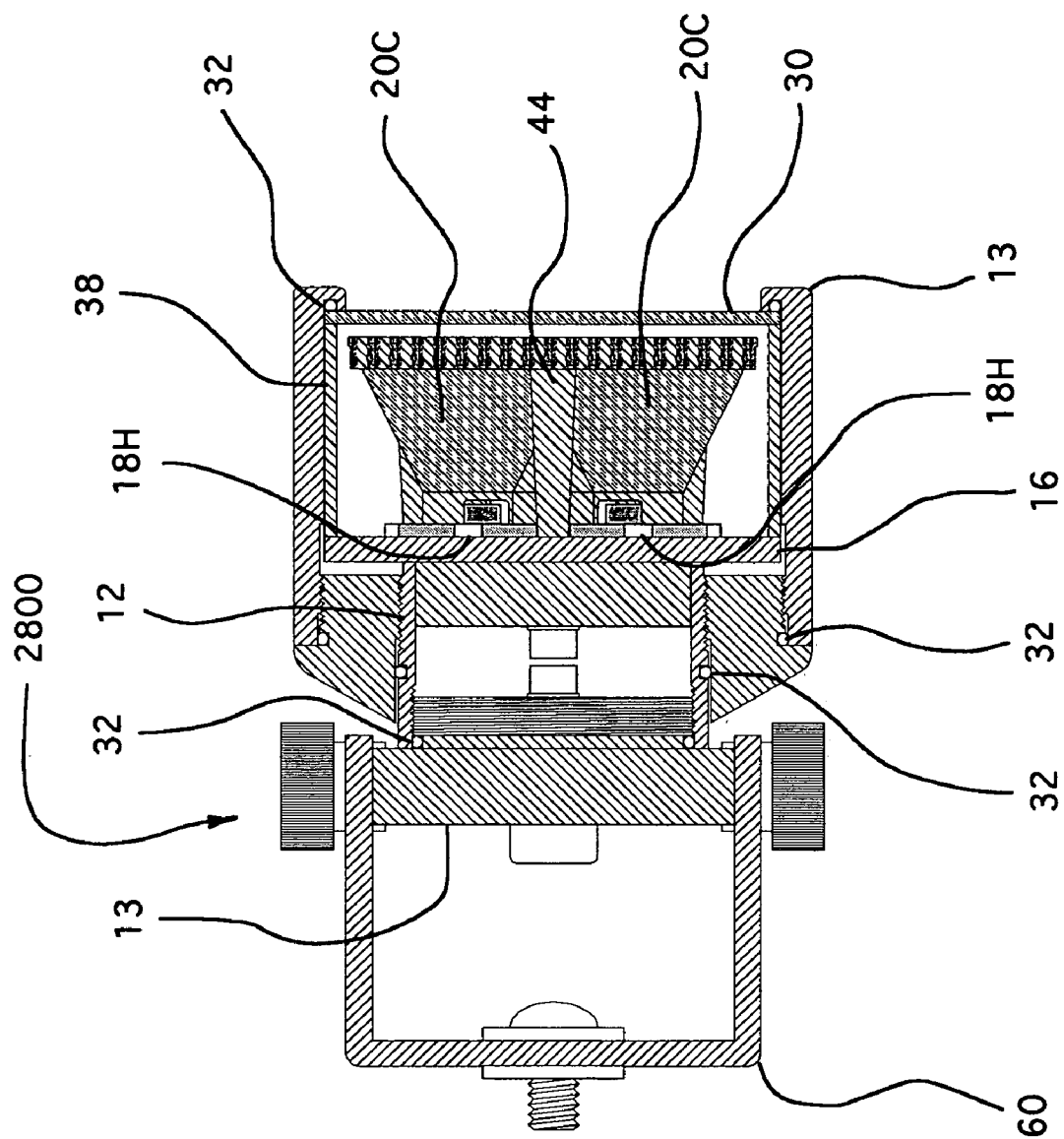
FIG. 33 is a sectional side view of a light source according to another embodiment of the present invention.

FIG. 33 illustrates a remote powered user mounted light source 2800 similar to the light source 2700 discussed above. The front end cap 13 includes an array of LED elements 18H (e.g. 3), each with an optic 20C, on the mounting plate 40. The rear end cap 13 includes an end cap base 60 rotationally mounted thereto. The base 60 can be attached to the user, such as to a miner's helmet or the like.

Figure 34:
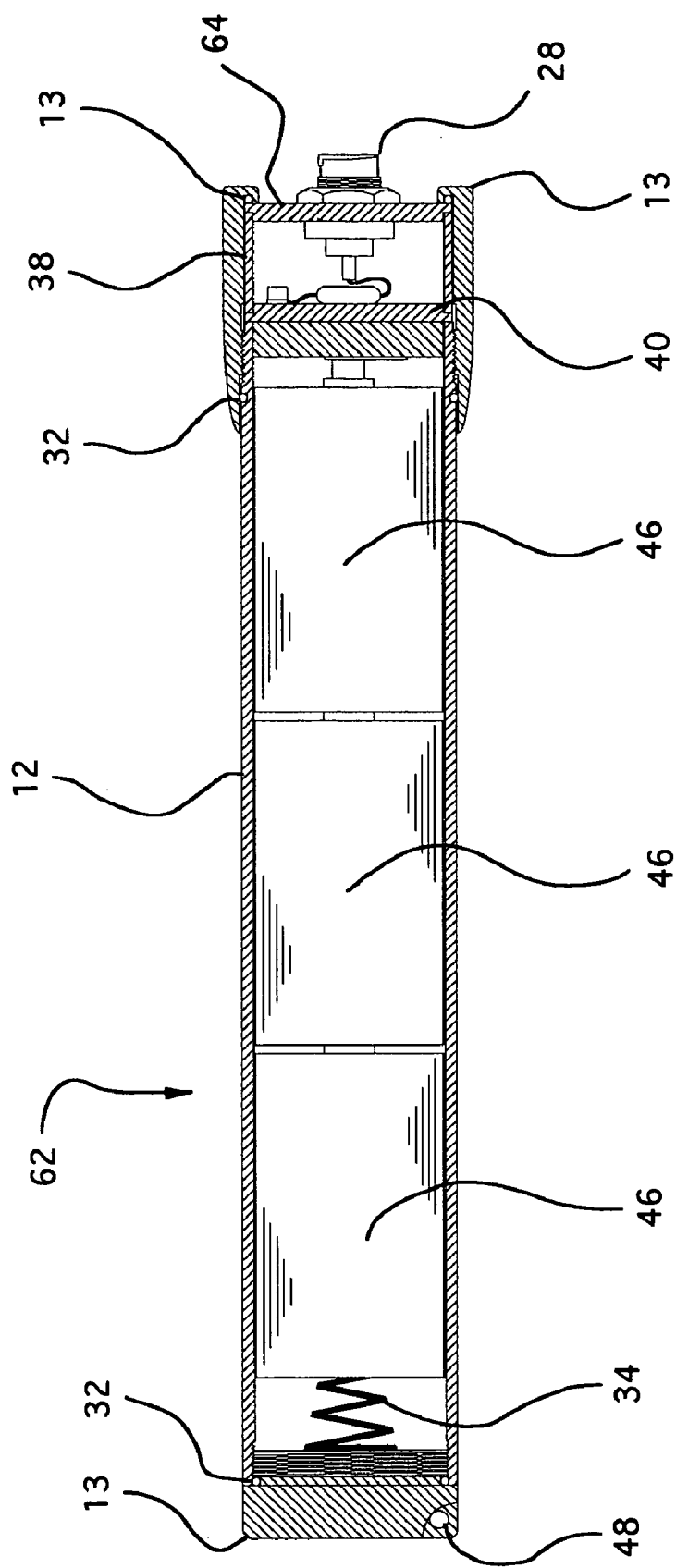
FIG. 34 is a sectional side view of a battery pack for the light source of FIGS. 32 and 33 according to the present invention.

FIG. 34 illustrates a remote battery pack 62 for powering a user mounted light source such as 2700 or 2800. The battery pack 62 uses the same modular concepts incorporated into the light sources discussed above including a pair of end caps 13 secured to opposite ends of a tubular housing 12. The front end cap 13 includes a power cord extending from the power coupling 28 secured to a mounting plate 64, with the electrical cord extending through the rear end cap 13 and through the tubular housing 12 of the light source 2700 or 2800 which is being powered by the battery pack 62. The battery pack 62 carries three D-cell sized batteries 46 for powering the light source 2700 or 2800 that can be attached to the user, such as to a miner's helmet or the like. The battery pack will typically be secured to the user's belt or the like.

Figure 35:
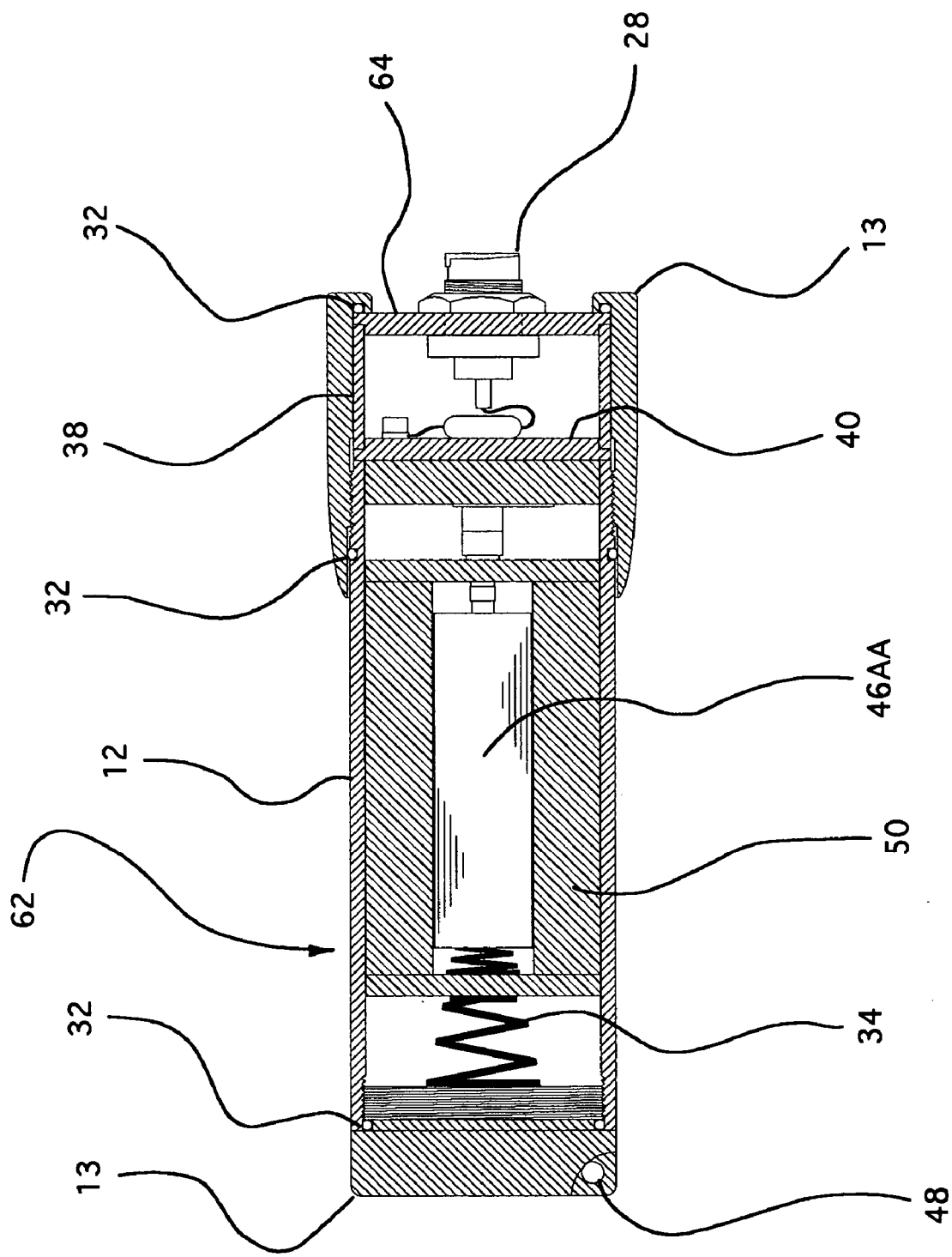
FIG. 35 is a sectional side view of a battery pack for the light source of FIGS. 32 and 33 according to the present invention.

FIG. 35 illustrates a remote battery pack 62 for powering a user mounted light source such as 2700 or 2800. The battery pack 62 of FIG. 35 is essentially the same as the pack 62 shown in FIG. 34 but is sized to hold three AA sized batteries 46AA in a mount 50.

Figure 36:
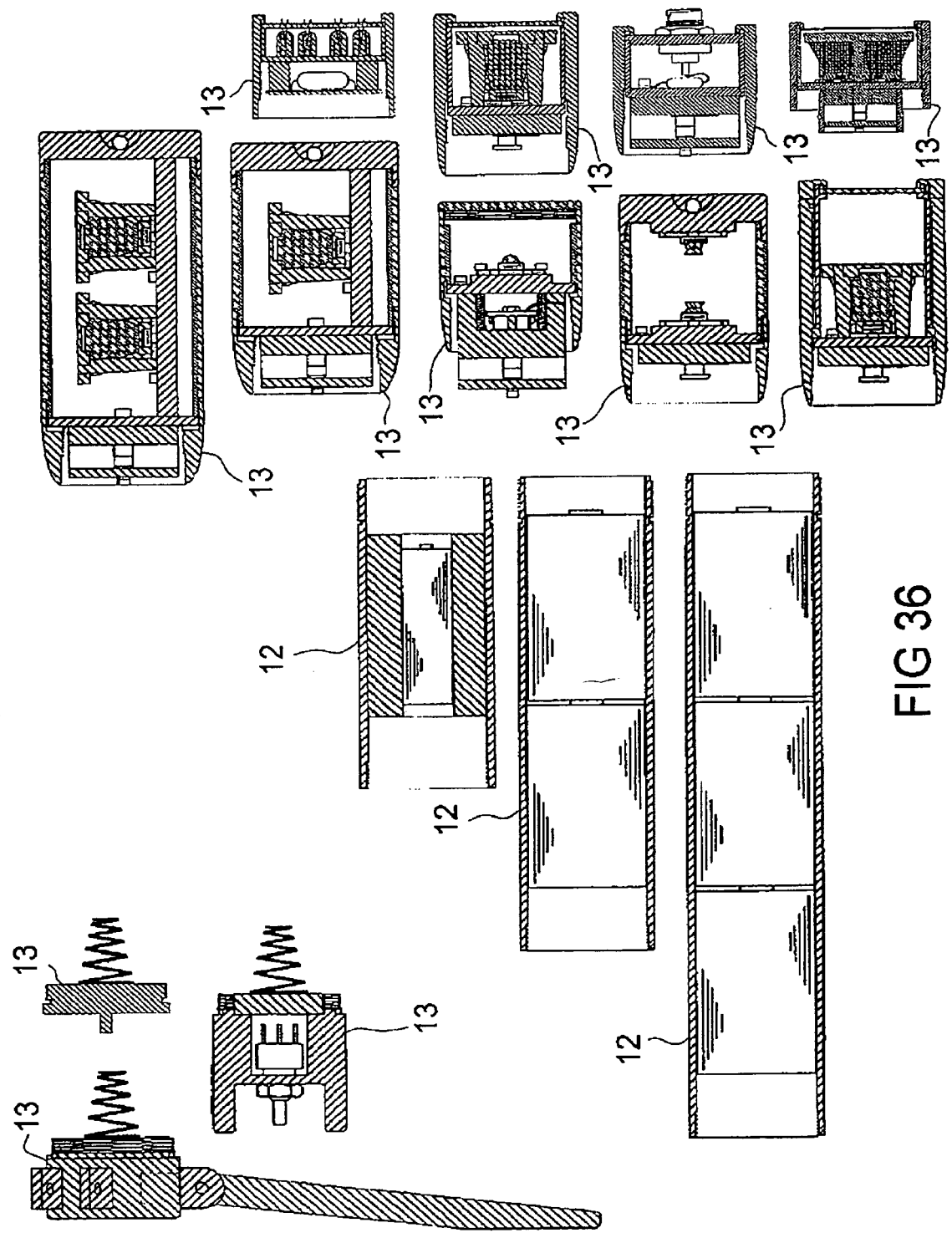
FIG. 36 is a sectional side view of modular housing and end cap components for forming many of the light sources disclosed in the earlier Figures according to the present invention.

FIG. 36 is a sectional side view of modular housings 12 and end caps 13 for forming many of the light sources disclosed in the earlier figures. As evidenced in the earlier figures, this small number of components can be combined into a wide variety of lighting sources which are shown in earlier figures and described above.

It will be apparent to those of ordinary skill in the art that various modifications may be made to the present invention without departing from the spirit and scope thereof. The scope of the present invention is defined by the appended claims and equivalents thereto.

We claim:

1. A modular light source system for forming a plurality of distinct light sources comprising:
   at least one common tubular housing;
   a plurality of LED based lighting members, each individual LED based lighting member comprising at least one LED element and selectively mounted in each tubular housing, wherein each distinct lighting source comprises one of the LED based lighting member;
   a plurality of end caps selectively attached to the opposed ends of each tubular housing, wherein each distinct light source is formed of a pair of the end caps, whereby distinct light sources can be formed through replacement of the LED based lighting members and the end caps.

2. The modular system of claim 1 wherein each said end cap is threaded for attachment to the tubular housing.

3. The modular system of claim 1 wherein at least one LED lighting member includes at least two LED elements with each LED element being at least one watt.

4. The modular system of claim 1 wherein the distinct light sources include at least two light sources from the group of light sources including a fiber optic bundle light source, an axial light emitting flashlight, a radial light emitting lantern, and a right angle light emitting trouble light.

5. The modular system of claim 1 further including at least one battery holding tube received in the tubular housing and which houses batteries in an annular array.

6. The modular system of claim 1 wherein the distinct light sources include at least a fiber optic bundle light source, an axial light emitting flashlight, a radial light emitting lantern, and a right angle light emitting trouble light.

7. The modular system of claim 1 further including at least one LED based signaling members, each individual LED based signaling member comprising at least one LED element and selectively mounted in each tubular housing, wherein each LED based signaling member forms a signaling device when mounted on the tubular housing with a pair of the end caps.

8. The modular system of claim 7 further including a controller for flashing the single LED element of at least one LED based signaling member.

9. The modular system of claim 1 further including at least one end cap having a manually moveable slide mount for adjusting the position of an optic relative to an optic on the LED element of the LED based lighting member, whereby the slide mount provides a light focusing mechanism.

10. The modular system of claim 1 wherein at least one end cap is threaded to the tubular housing and includes a fiber optic bundle coupling for receipt of an end of a fiber optic bundle there in.

11. The modular system of claim 1 wherein at least one end cap is threaded to the housing and includes a power coupling for connection to an external power source through a power cord.

12. The modular system of claim 1 wherein at least one end cap has three pivoting, locking legs to support the light source when the legs are deployed.

13. The modular system of claim 1 wherein at least one end cap includes a radial, tubular window and a support that allows the light source to be hung in a desired location.

14. A signal light comprising:

An anodized aluminum tubular housing;

one high output LED element mounted in the tubular housing; and a pair of end caps selectively threaded to the opposed ends of the tubular housing, wherein one end cap has a radial window, wherein one end cap has three pivoting, locking legs to support the signal light when the legs are deployed.

15. The signal light of claim 14 wherein each leg is pivoted about a pin connection on the end cap and moveable from a stored position adjacent the tubular housing, wherein each leg is generally perpendicular to the housing in the deployed position, and wherein a rearward end of the leg can be pushed into a receiving hole in the end cap to lock the leg in the deployed position.

16. The signal light of claim 15 wherein at least one end cap includes a support that allows the signal light to be hung in a desired location.

17. A mounted LED light source comprising:

a tubular housing, having a diameter sufficient to receive D-cell batteries;

an LED based lighting member comprising at least one LED element and selectively mounted in the tubular housing, wherein each LED element is at least 1 watt;

a pair of end caps selectively attached to the opposed ends of the tubular housing, wherein one said end cap includes one of an optic or a window in the path of light emitting from the LED light source and spaced from the LED element; and a clamp secured around the tubular housing securing the light source to a base object.

18. The light source of claim 17 wherein each said end cap is threaded for attachment to an anodized aluminum tubular housing.

19. The light source of claim 18 wherein the LED lighting member includes a conical collimating optic which is adjacent the single LED element.

* * * * *